United States Patent
Wang et al.

(10) Patent No.: US 11,637,755 B2
(45) Date of Patent: *Apr. 25, 2023

(54) SDN NETWORK SYSTEM, CONTROLLER, AND CONTROLLING METHOD

(71) Applicant: Huawei Technologies Co., Ltd., Shenzhen (CN)

(72) Inventors: Donghui Wang, Beijing (CN); Jinming Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 40 days.

This patent is subject to a terminal disclaimer.

(21) Appl. No.: 17/205,357

(22) Filed: Mar. 18, 2021

(65) Prior Publication Data

US 2021/0211359 A1 Jul. 8, 2021

Related U.S. Application Data

(63) Continuation of application No. 16/665,773, filed on Oct. 28, 2019, now Pat. No. 10,972,357, which is a (Continued)

(30) Foreign Application Priority Data

Apr. 29, 2014 (CN) .......................... 201410178870.8

(51) Int. Cl.
*H04L 41/12* (2022.01)
*H04L 41/044* (2022.01)
*H04L 12/46* (2006.01)

(52) U.S. Cl.
CPC .......... *H04L 41/12* (2013.01); *H04L 12/4641* (2013.01); *H04L 41/044* (2013.01)

(58) Field of Classification Search
CPC ... H04L 41/12; H04L 41/044; H04L 12/4641; H04L 41/122; H04L 41/342

See application file for complete search history.

(56) References Cited

U.S. PATENT DOCUMENTS

| | | |
|---|---|---|
| 2011/0317701 A1 | 12/2011 | Yamato et al. |
| 2013/0044761 A1 | 2/2013 | Koponen et al. |
| 2013/0329601 A1* | 12/2013 | Yin .................. H04L 45/02 370/254 |

FOREIGN PATENT DOCUMENTS

| | | |
|---|---|---|
| CN | 103401786 A | 11/2013 |
| CN | 103688497 A | 3/2014 |
| EP | 1635506 A1 | 3/2006 |
| EP | 3038303 A1 | 6/2016 |
| WO | 2013026050 A1 | 2/2013 |

OTHER PUBLICATIONS

Tootoonchian, A., et al., "HyperFlow: A Distributed Control Plane for OpenFlow," Proceeding of the Internet Network Management Conference on Research on Enterprise Networking, USENIX, 2010, 6 pages.

(Continued)

*Primary Examiner* — Frantz B Jean
(74) *Attorney, Agent, or Firm* — Conley Rose, P.C.

(57) ABSTRACT

A software defined network (SDN) system, controller, and controlling method, where the SDN system includes at least one $N^{th}$ level controller and at least two $(N+1)^{th}$ level controllers belonging to the $N^{th}$ level controller, where the $(N+1)^{th}$ level controller is configured to receive a first message sent by a node belonging to the $(N+1)^{th}$ level controller, and when the first message is a cross-domain message according to status information of each node that is managed by the $(N+1)^{th}$ level controller, forward the first message to the $N^{th}$ level controller to which the $(N+1)^{th}$ level controller belongs, and the $N^{th}$ level controller receives the first message, and perform decision processing according to status information of the $(N+1)^{th}$ level controller that is (Continued)

managed by and belongs to the $N^{th}$ level controller and status information of boundary nodes of the $(N+1)^{th}$ level controller belonging to the $N^{th}$ level controller.

20 Claims, 7 Drawing Sheets

Related U.S. Application Data continuation of application No. 15/338,712, filed on Oct. 31, 2016, now Pat. No. 10,498,607, which is a continuation of application No. PCT/CN2015/077397, filed on Apr. 24, 2015.

(56) References Cited

OTHER PUBLICATIONS

"OpenFlow Switch Specification," Open Networking Foundation, Version 1.3.4, (Protocol Version 0x04), Mar. 27, 2014, 171 pages.
"SDN Architecture," XP44073622, Open Networking Foundation, Mar. 20, 2014, 73 pages.
Vasseur, JP., Ed., "Path Computation Element (PCE) Communication Protocol (PCEP)," RFC 5440, Mar. 2009, 37 pages.
King, D., Ed., Et al., "The Application of the Path Computation Element Architecture to the Determination of a Sequence of Domains in MPLS and GMPLS," RFC 6805, Nov. 2012, 33 pages.

\* cited by examiner

SDN NETWORK SYSTEM, CONTROLLER, AND CONTROLLING METHOD

CROSS-REFERENCE TO RELATED APPLICATIONS

This application is a continuation of U.S. patent application Ser. No. 16/665,773 (now, U.S. Pat. No. 10,972,357), filed on Oct. 28, 2019, which is a continuation of U.S. patent application Ser. No. 15/338,712 (now, U.S. Pat. No. 10,498,607), filed on Oct. 31, 2016, which is a continuation of International Application No. PCT/CN2015/077397, filed on Apr. 24, 2015. The International Application claims priority to Chinese Patent Application No. 201410178870.8, filed on Apr. 29, 2014. All of the afore-mentioned patent applications are hereby incorporated by reference in their entireties.

TECHNICAL FIELD

The present disclosure relates to the field of communications technologies, and in particular, to a software defined network (SDN) system, controller, and controlling method.

BACKGROUND

A SDN is a new network architecture in which control and management are separated. In the SDN, a dedicated device deploys a high-level policy, and a network device forwards data under the guidance of the high-level policy such that many complex functions carried by the network device are reduced, and flexibility and an entirety of a network can be improved.

An OPENFLOW technology, as a southbound interface of an SDN architecture, is a key representative technology in the SDN field. In an OPENFLOW network, a topology and information of an entire network are managed using an OPENFLOW controller. In a large-scale data center architecture or a cross-operator OPENFLOW network architecture, the OPENFLOW network is divided into different areas, and a controller is configured for each area. When receiving a data transmission request, a controller calculates a network path according to networking information stored in the controller, and sends a path out of a local domain to each corresponding controller. After receiving path information, the corresponding controller directly sends the path information to a switching node in a domain of the corresponding controller.

Each controller in the foregoing network architecture can acquire the networking information, and when a controller is attacked, the networking information is leaked.

SUMMARY

Embodiments of the present disclosure provide an SDN system, controller, and controlling method in order to resolve a problem in an existing network architecture that each controller can acquire networking information, and the networking information is leaked when a controller is attacked.

According to a first aspect, an embodiment of the present disclosure provides an SDN system, including at least one $N^{th}$ level controller and at least two $(N+1)^{th}$ level controllers belonging to the $N^{th}$ level controller, where N is an integer greater than or equal to 1, where the $(N+1)^{th}$ level controller is configured to receive a first message sent by a node belonging to the $(N+1)^{th}$ level controller, and when the first message is a cross-domain message according to status information of each node that is managed by the $(N+1)^{th}$ level controller and that belongs to the $(N+1)^{th}$ level controller, forward the first message to the $N^{th}$ level controller to which the $(N+1)^{th}$ level controller belongs, and the $N^{th}$ level controller is configured to receive the first message forwarded by the $(N+1)^{th}$ level controller belonging to the $N^{th}$ level controller, and perform decision processing according to status information of the $(N+1)^{th}$ level controller that is managed by the $N^{th}$ level controller and that belongs to the $N^{th}$ level controller and status information of boundary nodes of the $(N+1)^{th}$ level controller belonging to the $N^{th}$ level controller, where boundary nodes of each $(N+1)^{th}$ level controller include a node, which is connected to a node belonging to another $(N+1)^{th}$ level controller, of all nodes belonging to the $(N+1)^{th}$ level controller, the first message includes an identifier of the node sending the first message, and the cross-domain message includes an identifier of the node belonging to the other $(N+1)^{th}$ level controller.

In a first possible implementation manner of the first aspect, the $(N+1)^{th}$ level controller is further configured to add an identifier of the $(N+1)^{th}$ level controller to the first message, to obtain a second message if the received first message includes an identifier of another $(N+1)^{th}$ level controller. The $(N+1)^{th}$ level controller is further configured to send the second message to the $N^{th}$ level controller to which the $(N+1)^{th}$ level controller belongs, and the $N^{th}$ level controller is further configured to receive a second message sent by each $(N+1)^{th}$ level controller belonging to the $N^{th}$ level controller, and determine a backbone topology of the SDN system according to the second message in order to determine a backbone transmission path of data in the SDN system according to the backbone topology.

With reference to the first possible implementation manner of the first aspect, in a second possible implementation manner of the first aspect, the SDN system further includes at least one $(N-1)^{th}$ level controller, at least two $N^{th}$ level controllers belonging to the $(N-1)^{th}$ level controller, and at least four $(N+1)^{th}$ level controllers belonging to the at least two $N^{th}$ level controllers, where N is an integer greater than 1, where the $N^{th}$ level controller is further configured to replace the identifier of the $(N+1)^{th}$ level controller in the second message with an identifier of the $N^{th}$ level controller, to obtain a third message if the second message includes an identifier of an $(N+1)^{th}$ level controller not belonging to the $N^{th}$ level controller. The $N^{th}$ level controller is further configured to send the third message to the $(N-1)^{th}$ level controller to which the $N^{th}$ level controller belongs, and the $(N-1)^{th}$ level controller is configured to receive the third message sent by the $N^{th}$ level controller belonging to the $(N-1)^{th}$ level controller, and determine the backbone topology of the SDN system according to the third message in order to determine the backbone transmission path of the data in the SDN system according to the backbone topology of the SDN system.

With reference to the first or second possible implementation manner of the first aspect, in a third possible implementation manner of the first aspect, the $(N+1)^{th}$ level controller is further configured to separately send a fourth message to the $N^{th}$ level controller to which the $(N+1)^{th}$ level controller belongs and a node belonging to the $(N+1)^{th}$ level controller, where the fourth message includes an identifier of the node to which the fourth message is sent and the identifier of the $(N+1)^{th}$ level controller. The $N^{th}$ level controller is further configured to receive the fourth message sent by the $(N+1)^{th}$ level controller belonging to the $N^{th}$ level controller, and the $N^{th}$ level controller is further configured to determine the backbone topology of the SDN system according to the second message and the fourth message that include an identifier of a same node in order to determine the backbone transmission path of the data in the SDN system according to the backbone topology of the SDN system.

With reference to any one of the first aspect and the first to third implementation manners of the first aspect, in a fourth possible implementation manner of the first aspect, the $(N+1)^{th}$ level controller is further configured to update the status information, which is included in the message, of the node according to the first message if the received first message includes status information of the node belonging to the $(N+1)^{th}$ level controller, and the node is a boundary node of the $(N+1)^{th}$ level controller, and send the first message to the $N^{th}$ level controller to which the $(N+1)^{th}$ level controller belongs, and the $N^{th}$ level controller is further configured to update the status information of the boundary node of the $(N+1)^{th}$ level controller according to the first message.

With reference to any one of the first aspect and the first to fourth implementation manners of the first aspect, in a fifth possible implementation manner of the first aspect, the $(N+1)^{th}$ level controller is further configured to send a fifth message to the $N^{th}$ level controller to which the $(N+1)^{th}$ level controller belongs if the received first message is a data transmission request message and includes an identifier of a node not belonging to the $(N+1)^{th}$ level controller, where the fifth message includes the identifier of the $(N+1)^{th}$ level controller, an identifier of a target node, and a first transmission path, and the first transmission path includes a source node and a first boundary node belonging to a same $(N+1)^{th}$ level controller. The $N^{th}$ level controller is further configured to receive the fifth message sent by the $(N+1)^{th}$ level controller belonging to the $N^{th}$ level controller. The $N^{th}$ level controller is further configured to send a message for acquiring a second transmission path to another $(N+1)^{th}$ level controller belonging to the $N^{th}$ level controller except the $(N+1)^{th}$ level controller, where the second transmission path includes the target node and a second boundary node belonging to a same $(N+1)^{th}$ level target controller. The $N^{th}$ level controller is further configured to determine a first backbone transmission path if the first boundary node and the second boundary node are connected, where the first backbone transmission path includes the source node, the first boundary node, the second boundary node, and the target node, the $(N+1)^{th}$ level controller is further configured to receive the first backbone transmission path sent by the $N^{th}$ level controller to which the $(N+1)^{th}$ level controller belongs, and the $(N+1)^{th}$ level controller is further configured to determine a sub-transmission path of the first backbone transmission path, and instruct each node in the first sub-transmission path to sequentially transmit the data from the source node to the target node.

With reference to the fifth possible implementation manner of the first aspect, in a sixth possible implementation manner of the first aspect, the $N^{th}$ level controller is further configured to determine a third boundary node connected to the first boundary node and a fourth boundary node connected to the second boundary node if the second boundary node and the first boundary node are not connected, and the $N^{th}$ level controller is further configured to determine a second primary backbone transmission path if the third boundary node and the fourth boundary node belong to a same $(N+1)^{th}$ level controller, where the second primary backbone transmission path includes the source node, the first boundary node, the second boundary node, the target node, the third boundary node, and the fourth boundary node.

With reference to any one of the first aspect and the first to sixth implementation manners of the first aspect, in a seventh possible implementation manner of the first aspect, the $N^{th}$ level controller is further configured to send a first broadcast message to the $(N+1)^{th}$ level controllers belonging to the $N^{th}$ level controller, where the first broadcast message is used to acquire status information of the $(N+1)^{th}$ level controllers belonging to the $N^{th}$ level controller and status information of boundary nodes of the $(N+1)^{th}$ level controllers. The $(N+1)^{th}$ level controller is further configured to return, according to the first broadcast message, status information of the $(N+1)^{th}$ level controller to the $N^{th}$ level controller to which the $(N+1)^{th}$ level controller belongs, and the $(N+1)^{th}$ level controller is further configured to send the first broadcast message to the boundary nodes belonging to the $(N+1)^{th}$ level controller such that the boundary nodes return status information of the boundary nodes to the $(N+1)^{th}$ level controller, and send the received status information of the boundary nodes to the $N^{th}$ level controller.

According to a second aspect, an embodiment of the present disclosure provides an SDN controller configured to perform functions of the $N^{th}$ level controller, the $(N+1)^{th}$ level controller, or the $(N-1)^{th}$ level controller in any one of the first aspect and all implementation manners of the first aspect.

According to a third aspect, an embodiment of the present disclosure provides an SDN controlling method, including receiving, by an $(N+1)^{th}$ level controller, a first message sent by a node belonging to the $(N+1)^{th}$ level controller, and forwarding, by the $(N+1)^{th}$ level controller, the first message to an $N^{th}$ level controller to which the $(N+1)^{th}$ level controller belongs such that the $N^{th}$ level controller performs decision processing on the first message, if the first message is a cross-domain message according to status information of each node that is managed by the $(N+1)^{th}$ level controller and that belongs to the $(N+1)^{th}$ level controller, where the first message includes an identifier of the node sending the first message, and the cross-domain message includes an identifier of a node belonging to another $(N+1)^{th}$ level controller.

In a first implementation manner of the third aspect, the forwarding the first message to an $N^{th}$ level controller to which the $(N+1)^{th}$ level controller belongs includes adding, by the $(N+1)^{th}$ level controller, an identifier of the $(N+1)^{th}$ level controller to the first message, to obtain a second message if the received first message includes an identifier of another $(N+1)^{th}$ level controller, and sending, by the $(N+1)^{th}$ level controller, the second message to the $N^{th}$ level controller to which the $(N+1)^{th}$ level controller belongs such that the $N^{th}$ level controller determines a backbone topology of the SDN system according to the second message.

With reference to the first aspect or the first implementation manner of the first aspect, in a second implementation manner of the first aspect, the SDN controlling method further includes sending, by the $(N+1)^{th}$ level controller, a fifth message to the $N^{th}$ level controller to which the $(N+1)^{th}$ level controller belongs if the received first message is a data transmission request message and includes an identifier of a node not belonging to the $(N+1)^{th}$ level controller, where the fifth message includes the identifier of the $(N+1)^{th}$ level controller, an identifier of a target node, and a first transmission path, and the first transmission path includes a source node and a first boundary node belonging to the same $(N+1)^{th}$ level controller, receiving, by the $(N+1)^{th}$ level controller, a first backbone transmission path sent by the $N^{th}$ level controller to which the $(N+1)^{th}$ level controller belongs, and determining, by the $(N+1)^{th}$ level controller, a sub-transmission path of the first backbone transmission path, and instructing each node in the first sub-transmission path to sequentially transmit the data from the source node to the target node.

With reference to any one of the third aspect and the first and second possible implementation manners of the third aspect, in a third possible implementation manner of the third aspect, the $(N+1)^{th}$ level controller further receives a first broadcast message sent by the $N^{th}$ level controller to which the $(N+1)^{th}$ level controller belongs, the $(N+1)^{th}$ level controller returns, according to the first broadcast message, status information of the $(N+1)^{th}$ level controller to the $N^{th}$ level controller to which the $(N+1)^{th}$ level controller belongs, and the $(N+1)^{th}$ level controller sends the first broadcast message to boundary nodes belonging to the $(N+1)^{th}$ level controller such that the boundary nodes return status information of the boundary nodes to the $(N+1)^{th}$ level controller, and send the received status information of the boundary nodes to the $N^{th}$ level controller.

According to a fourth aspect, an embodiment of the present disclosure provides an SDN controlling method, including receiving, by an $N^{th}$ level controller, a first message forwarded by an $(N+1)^{th}$ level controller belonging to the $N^{th}$ level controller, and performing decision processing according to status information of the $(N+1)^{th}$ level controller that is managed by the $N^{th}$ level controller and that belongs to the $N^{th}$ level controller and status information of boundary nodes of the $(N+1)^{th}$ level controller belonging to the $N^{th}$ level controller, where boundary nodes of each $(N+1)^{th}$ level controller include a node, which is connected to a node belonging to another $(N+1)^{th}$ level controller, of all nodes belonging to the $(N+1)^{th}$ level controller.

In a first possible implementation manner of the fourth aspect, the performing decision processing includes determining a backbone topology of the SDN system, determining a backbone transmission path of data transmission, or updating the status information of the $(N+1)^{th}$ level controller that is managed by the $N^{th}$ level controller and that belongs to the $N^{th}$ level controller and the status information of the boundary nodes of the $(N+1)^{th}$ level controller belonging to the $N^{th}$ level controller.

For the SDN system, controller, and controlling method according to the embodiments of the present disclosure, each level of controller separately manages status information of a network belonging to a domain of the controller, an upper-level controller manages a lower-level controller and status information of boundary nodes of the lower-level controller, and the lower-level controller manages status information of nodes belonging to the lower-level controller such that when any controller is attacked, networking information cannot be leaked, thereby improving security of network information.

BRIEF DESCRIPTION OF DRAWINGS

To describe the technical solutions in the embodiments of the present disclosure more clearly, the following describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
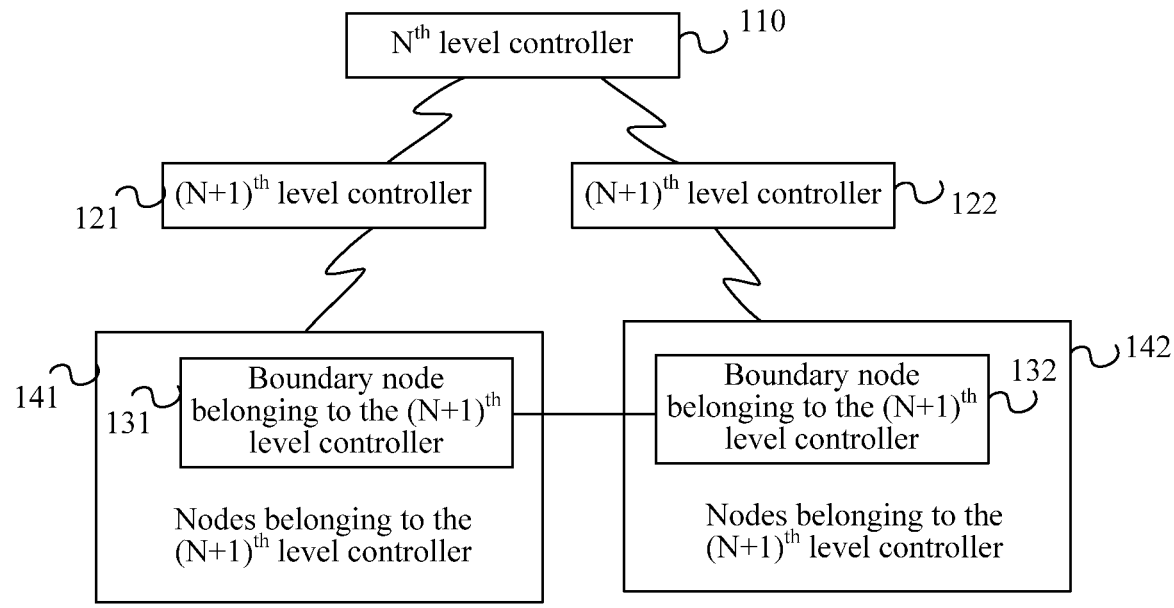
FIG. 1 is a schematic structural diagram of Embodiment 1 of an SDN system according to an embodiment of the present disclosure.

FIG. 1 is a schematic structural diagram of Embodiment 1 of an SDN system according to an embodiment of the present disclosure. As shown in FIG. 1, the SDN system includes at least one $N^{th}$ level controller 110 and at least two $(N+1)^{th}$ level controllers 121 and 122 directly belonging to the $N^{th}$ level controller 110, where N is an integer greater than or equal to 1.

The $(N+1)^{th}$ level controller 121 or 122 is configured to receive a first message sent by a node 141 or 142 belonging to the $(N+1)^{th}$ level controller 121 or 122, and when the first message is a cross-domain message according to status information of each node that is managed by the $(N+1)^{th}$ level controller 121 or 122 and that belongs to the $(N+1)^{th}$ level controller 121 or 122, forward the first message to the $N^{th}$ level controller 110 to which the $(N+1)^{th}$ level controller 121 or 122 belongs, and the $N^{th}$ level controller 110 is configured to receive the first message forwarded by the $(N+1)^{th}$ level controller 121 or 122 belonging to the $N^{th}$ level controller 110, and perform decision processing according to status information of the $(N+1)^{th}$ level controller that is managed by the $N^{th}$ level controller 110 and that belongs to the $N^{th}$ level controller 110 and status information of boundary nodes of the $(N+1)^{th}$ level controller belonging to the $N^{th}$ level controller 110. The boundary node 131 or 132 of each $(N+1)^{th}$ level controller includes a node, which is connected to a node belonging to another $(N+1)^{th}$ level controller, of all nodes belonging to the $(N+1)^{th}$ level controller, the first message includes an identifier of the node sending the first message, and the cross-domain message includes an identifier of the node belonging to the other $(N+1)^{th}$ level controller.

For example, an SDN system in FIG. 1 has one $N^{th}$ level controller and only two $(N+1)^{th}$ level controllers directly belonging to the $N^{th}$ level controller 110. If each $(N+1)^{th}$ level controller separately has 10 nodes directly belonging to the $(N+1)^{th}$ level controller, and the two $(N+1)^{th}$ level controllers are separately connected to other $(N+1)^{th}$ level controllers using two nodes, that is, each $(N+1)^{th}$ level controller has two boundary nodes. Correspondingly, the $N^{th}$ level controller is configured to manage status information of the four boundary nodes, and the two $(N+1)^{th}$ level controllers are separately configured to manage status information of each ten boundary nodes directly belonging to the two $(N+1)^{th}$ level controllers.

Belonging includes direct belonging and indirect belonging. The direct belonging refers to that communication can be directly performed between controllers or between a controller and a node without forwarding of a third controller or node. The indirect belonging refers to that communication cannot be directly performed between controllers or between a controller and a node, and communication needs to be performed by means of forwarding of another controller. For the $(N+1)^{th}$ level controller, the cross-domain message refers to a message between a node belonging to the $(N+1)^{th}$ level controller and a node not belonging to the $(N+1)^{th}$ level controller. For the $N^{th}$ level controller, the cross-domain message refers to a message between an $(N+1)^{th}$ level controller belonging to the $N^{th}$ level controller and an $(N+1)^{th}$ level controller not belonging to the $N^{th}$ level controller. Status information of a node includes connection status information, port status information, flow table status information of the node, and an identifier of the node, and may also include other information that may indicate a usage state of the node such that a controller may determine, according to the status information of the node, which port of the node is currently available, traffic that the available port can carry, and the like. The identifier (ID) of the node may be an ID of the node or any other identifier that uniquely identifies the node from other nodes. Status information of a controller includes a connection status of the controller, load traffic in a management domain of the controller, available load traffic of the controller, and an identifier of the controller. The identifier of the controller may be an ID of the controller or any other identifier that uniquely identifies the controller from other controllers.

The performing, by the $N^{th}$ level controller, decision processing refers to that the $N^{th}$ level controller processes the first message according to a type of the first message, for example, makes a decision on a data route, makes a decision on a network topology, or updates the status information of the $(N+1)^{th}$ level controller managed by the $N^{th}$ level controller or updates a status message of the boundary nodes of the $(N+1)^{th}$ level controller managed by the $N^{th}$ level controller.

Further, in an SDN, it may be set that each controller connects to a controller directly belonging to the controller using a southbound interface, and network information is exchanged using the OPENFLOW protocol or the non-OPENFLOW protocol.

According to the SDN system provided in this embodiment of the present disclosure, each level of controller separately manages status information of a network belonging to a domain of the controller, an upper-level controller manages a lower-level controller and status information of boundary nodes of the lower-level controller, and the lower-level controller manages status information of nodes belonging to the lower-level controller such that when any controller is attacked, networking information cannot be leaked, thereby improving security of network information.

Further, in the foregoing SDN system, the $(N+1)^{th}$ level controller is further configured to add an identifier of the $(N+1)^{th}$ level controller to the first message, to obtain a second message if the received first message includes an identifier of another $(N+1)^{th}$ level controller. The $(N+1)^{th}$ level controller is further configured to send the second message to the $N^{th}$ level controller to which the $(N+1)^{th}$ level controller belongs, and the $N^{th}$ level controller is further configured to receive a second message sent by each $(N+1)^{th}$ level controller belonging to the $N^{th}$ level controller, and determine a backbone topology of the SDN system according to the second message in order to determine a backbone transmission path of data in the SDN system according to the backbone topology.

At an initial stage of network construction, to enable each level of controller to acquire information managed by the controller, each $(N+1)^{th}$ level controller is further configured to send a fourth message to each node belonging to the $(N+1)^{th}$ level controller in order to instruct each node to send the fourth message to a node connected to the node, and receive a first message returned according to the fourth message by each nodes belonging to the $(N+1)^{th}$ level controller, and if the first message includes an identifier of another $(N+1)^{th}$ level controller, after the identifier of the $(N+1)^{th}$ level controller is added to the first message, directly send a second message to the $N^{th}$ level controller 110 to which the $(N+1)^{th}$ level controller belongs, where the fourth message includes the identifier of the $(N+1)^{th}$ level controller and an identifier of a node receiving the fourth message, the first message includes identifiers of two nodes and an identifier of one $(N+1)^{th}$ level controller, and the second message includes identifiers of two nodes and identifiers of two $(N+1)^{th}$ level controllers, and the $N^{th}$ level controller is further configured to receive a second message sent by each $(N+1)^{th}$ level controller directly belonging to the $N^{th}$ level controller, and determine, according to two second messages including an identifier of a same node and an identifier of a same controller, information about connections between the $(N+1)^{th}$ level controllers belonging to the $N^{th}$ level controller.

Further, in an OPENFLOW network, the foregoing fourth message may be further a packet_out message. The packet_out message may include an identifier of a controller sending the packet_out message and an identifier of a node receiving the packet_out message. In addition, to control a flow direction of the packet_out message, the packet_out message may further include an identifier of a port of the node receiving the message. In this way, the node receiving the packet_out message may send the packet_out message out from a port corresponding to the identifier of the port. Further, a message carried by the packet_out massage may be an Link Layer Discovery Protocol (LLDP) message. In addition, after receiving a message that is sent by another node and whose packet_out header is removed, a node may add an identifier of the node and an identifier of a port of the node to the message, and then send the message, that is, a first message, to an $(N+1)^{th}$ level controller to which the node directly belongs, where the first message may be further a packet_in message.

Figure 2:
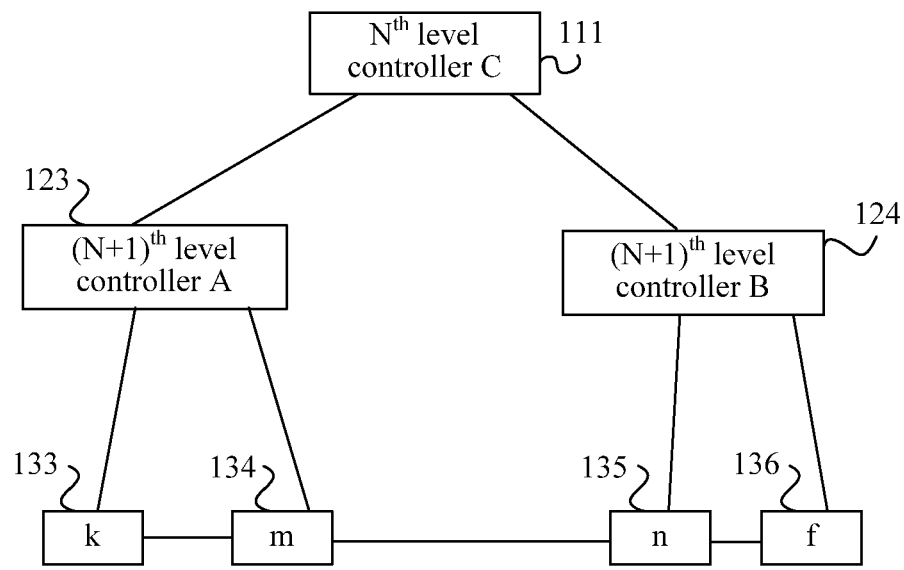
FIG. 2 is a schematic structural diagram of Embodiment 2 of an SDN system according to an embodiment of the present disclosure.

For example, FIG. 2 is a schematic structural diagram of Embodiment 2 of an SDN system according to an embodiment of the present disclosure. As shown in FIG. 2, in the SDN system, there are two $(N+1)^{th}$ level controllers A 123 and B 124 directly belonging to an $N^{th}$ level controller C 111, nodes k 133 and m 134 directly belong to the $(N+1)^{th}$ level controller A 123, nodes n 135 and f 136 directly belong to the $(N+1)^{th}$ level controller B 124, and the nodes m 134 and n 135 are connected.

Further, the first $(N+1)^{th}$ level controller A sends a packet_out message to a boundary node m of the $(N+1)^{th}$ level controller A, and instructs the boundary node m to send a message carried in the packet_out message out using a right port of the boundary node m, for example, sends an LLDP message out. The boundary node m is connected to a left port of a boundary node n of another $(N+1)^{th}$ level controller B by means of the right port, and therefore, the boundary node n of the other $(N+1)^{th}$ level controller B receives the LLDP message using the left port. Then, the boundary node n sends the LLDP message to the $(N+1)^{th}$ level controller B in a form of a packet_in message, and after receiving the packet_in message sent by the node n, the $(N+1)^{th}$ level controller B determines that the message includes an identifier of the $(N+1)^{th}$ level controller A and therefore determines that the node n is a boundary node. After an identifier of the $(N+1)^{th}$ level controller B is added to the packet_in message, the message may be sent to the $N^{th}$ level controller to which the $(N+1)^{th}$ level controller B directly belongs.

Correspondingly, after receiving first messages sent by both the $(N+1)^{th}$ level controller A and the $(N+1)^{th}$ level controller B, an $N^{th}$ level controller C may determine, according to the two first messages including the identifier of the $(N+1)^{th}$ level controller A, the identifier of the $(N+1)^{th}$ level controller B, an identifier of the boundary node m, and an identifier of the boundary node n, that the $(N+1)^{th}$ level controller A and the $(N+1)^{th}$ level controller B are connected by means of the right port of the boundary node m belonging to the $(N+1)^{th}$ level controller A and the left port of the boundary node n belonging to the $(N+1)^{th}$ level controller B.

If in the SDN system, there is another $(N+1)^{th}$ level controller belonging to the $N^{th}$ level controller C, or there are another pair of boundary nodes connecting the $(N+1)^{th}$ level controller A and the $(N+1)^{th}$ level controller B, the $N^{th}$ level controller may acquire connection relationships between all $(N+1)^{th}$ level controllers belonging to the $N^{th}$ level controller in a manner the same as or similar to the foregoing manner.

In addition, the $(N+1)^{th}$ level controller is further configured to determine information about connections of the nodes directly belonging to the $(N+1)^{th}$ level controller if the first message does not include an identifier of another $(N+1)^{th}$ level controller.

For example, if the foregoing $(N+1)^{th}$ level controller A receives a packet_in message sent by the node k directly belonging to the $(N+1)^{th}$ level controller A and finds by means of judgment that the packet_in message does not include an identifier of another $(N+1)^{th}$ level controller, it may be determined that the node k is a non-boundary node. Moreover, information about connections between the node k and another node in a management domain of the $(N+1)^{th}$ level controller A is determined by means of the packet_in message. An $(N+1)^{th}$ level controller may determine, in a same manner, information about connections of a node directly belonging to the $(N+1)^{th}$ level controller.

In another implementation manner of the foregoing SDN system, the SDN system further includes at least one $(N-1)^{th}$ level controller, at least two $N^{th}$ level controllers belonging to the $(N-1)^{th}$ level controller, and at least four $(N+1)^{th}$ level controllers belonging to the at least two $N^{th}$ level controllers, where N is an integer greater than 1.

The $N^{th}$ level controller is further configured to, if the second message includes an identifier of an $(N+1)^{th}$ level controller not belonging to the $N^{th}$ level controller, replace the identifier of the $(N+1)^{th}$ level controller in the second message with an identifier of the $N^{th}$ level controller, to obtain a third message. The $N^{th}$ level controller is further configured to send the third message to the $(N-1)^{th}$ level controller to which the $N^{th}$ level controller belongs, and the $(N-1)^{th}$ level controller is configured to receive the third message sent by the $N^{th}$ level controller belonging to the $(N-1)^{th}$ level controller, and determine the backbone topology of the SDN system according to the third message in order to determine the backbone transmission path of the data in the SDN system according to the backbone topology of the SDN system.

Figure 3:
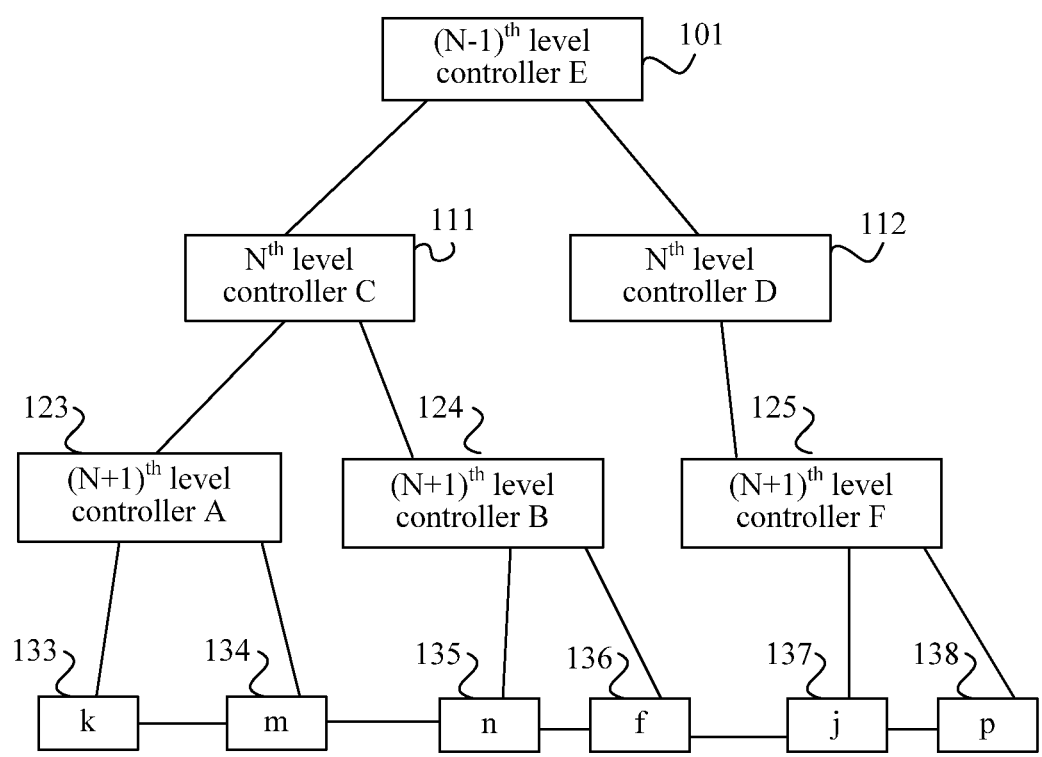
FIG. 3 is a schematic structural diagram of Embodiment 3 of an SDN system according to an embodiment of the present disclosure.

For example, FIG. 3 is a schematic structural diagram of Embodiment 3 of an SDN system according to an embodiment of the present disclosure. As shown in FIG. 3, based on the SDN system shown in FIG. 2, the SDN system further includes an $N^{th}$ level controller D 112, an $(N-1)^{th}$ level controller E 101, and an $(N+1)^{th}$ level controller F 125. The $N^{th}$ level controllers C 111 and D 112 directly belong to the $(N-1)^{th}$ level controller E 101, the $(N+1)^{th}$ level controller F 125 directly belongs to the $N^{th}$ level controller D 112. The $(N+1)^{th}$ level controllers A 123 and B 124 directly belong to the $N^{th}$ level controller C 111, nodes j 137 and p 138 directly belong to the $(N+1)^{th}$ level controller F 125, and nodes f 136 and j 137 are connected.

Further, after receiving a second message sent by the $(N+1)^{th}$ level controller B 124, the $N^{th}$ level controller C 111 finds by means of parsing that the second message includes an identifier of the $(N+1)^{th}$ level controller F 125, and the $N^{th}$ level controller C 111 determines that the $(N+1)^{th}$ level controller F 125 is not a controller directly belonging to the $N^{th}$ level controller C 111. Therefore, after identifiers of the $(N+1)^{th}$ level controllers F 125 and B 124 in the second message are replaced with an identifier of the $N^{th}$ level controller C 111, a third message may be then sent to the $(N-1)^{th}$ level controller E 101 to which the $N^{th}$ level controller C 111 directly belongs, where the fourth message includes the identifier of the $N^{th}$ level controller C 111, an identifier of the node j, and an identifier of the node f.

Correspondingly, the $(N-1)^{th}$ level controller E 101 receives fourth messages sent by the $N^{th}$ level controller C 111 and the $N^{th}$ level controller D 112. Through comparison, it is found that the two fourth messages have same identifiers the identifier of the node j 137 and the identifier of the node f 136, and therefore it may be determined that the $N^{th}$ level controller C 111 and the $N^{th}$ level controller D 112 are connected using the node f 136 and the node j 137.

Further, to facilitate that an $N^{th}$ level controller determines information about connections between $(N+1)^{th}$ level controllers according to messages sent by the $(N+1)^{th}$ level controllers, or an $(N-1)^{th}$ level controller determines information about connections between $N^{th}$ level controllers according to messages sent by the $N^{th}$ level controllers, it may be set that when the $(N+1)^{th}$ level controllers send the messages to the $N^{th}$ level controller, or when the $N^{th}$ level controller sends the messages to the $(N-1)^{th}$ level controller, an order of nodes included in the messages meets a preset rule. For example, it is regulated that the first message sequentially includes an identifier of a controller and an identifier of a node. The second message sequentially includes the identifier of the controller, the identifier of the node belonging to the former controller, and an identifier of a node sending the second message to the controller, the third message sequentially includes the identifier of the controller sending the first message, the identifier of the node belonging to the controller sending the first message, an identifier of a node sending the second message, and an identifier of a controller sending the third message, and so on. It should be noted that, the above descriptions of an order of identifiers of controllers and identifiers of nodes included in messages are merely exemplary for explanation. The order of the identifiers of the foregoing controllers and nodes may also be set according to a need as long as controllers receiving messages can recognize belonging between the nodes and the controllers.

Alternatively, to simplify that all levels of controllers determine information about connections between controllers or nodes in management domains of the controllers, in another implementation manner of this embodiment, the $(N+1)^{th}$ level controller is further configured to send a fourth message to the $N^{th}$ level controller to which the $(N+1)^{th}$ level controller belongs, where the fourth message includes an identifier of a node to which the fourth message is sent and the identifier of the $(N+1)^{th}$ level controller. The $N^{th}$ level controller is further configured to receive the fourth message sent by the $(N+1)^{th}$ level controller belonging to the $N^{th}$ level controller, and the $N^{th}$ level controller is further configured to determine the backbone topology of the SDN system according to the second message and the fourth message that include an identifier of a same node in order to determine the backbone transmission path of the data in the SDN system according to the backbone topology of the SDN system.

A network structure shown in FIG. 3 is used as an example. When sending a fourth message to the node f 136 directly belonging to the $(N+1)^{th}$ level controller B 124, the $(N+1)^{th}$ level controller B 124 may simultaneously send the message to the $N^{th}$ level controller C 111. After receiving the fourth message including an identifier of the $(N+1)^{th}$ level controller B 124 and the identifier of the node f 136, the $N^{th}$ level controller C 111 replaces the identifier of the $(N+1)^{th}$ level controller B 124 with the identifier of the $N^{th}$ level controller C 111 and sends a modified fourth message to the $(N-1)^{th}$ level controller E 101, that is, the $(N-1)^{th}$ level controller E 101 receives the modified fourth message including the identifier of the $N^{th}$ level controller C 111 and the identifier of the node f 136. Meanwhile, the $(N-1)^{th}$ level controller E 101 further receives a fourth message including an identifier of the $N^{th}$ level controller D 112, the identifier of the node f 136, and the identifier of the node j 137, the $(N-1)^{th}$ level controller E 101 may find, by means of parsing, two identifiers including a same node f 136, and it may be determined that the $N^{th}$ level controller C 111 and the $N^{th}$ level controller D 112 are connected by means of the node f 136 and the node j 137.

It should be noted that, in the above description of determining connection relationships between controllers or nodes by a controller in a management domain of the controller, each message may further carry an identifier of a port of a node such that the controller can determine connection relationships between the controllers or the nodes in a management domain of the controller more precisely. For example, in a network architecture shown in FIG. 3, the $(N-1)^{th}$ level controller E 101 may determine that the $N^{th}$ level controller C 111 is connected to a left port of the node j 137 of the $N^{th}$ level controller D 112 by means of a right port of the node f 136.

In addition, at an initial stage of network construction or when a status of a node in the SDN system changes, the node in the network may directly send a message to a controller to which the node belongs. The $(N+1)^{th}$ level controller is further configured to update the status information, which is included in the message, of the node according to the first message if the received first message includes status information of the node belonging to the $(N+1)^{th}$ level controller, and the node is a boundary node of the $(N+1)^{th}$ level controller, and send the first message to the $N^{th}$ level controller to which the $(N+1)^{th}$ level controller belongs, and the $N^{th}$ level controller is further configured to update the status information of the boundary node of the $(N+1)^{th}$ level controller according to the first message.

An architecture of the SDN system shown in FIG. 3 is used as an example. Assuming that in the network, a failure occurs in the right port, which is connected to the node n 135, of the node m 134, the node m 134 may send a first message to the $(N+1)^{th}$ level controller A 123 to which the node m directly belongs, where the first message may include the identifier of the node m 134 and a status of a port of the node m 134, or may further include a flow table status of the node and the like. After receiving the message, the $(N+1)^{th}$ level controller A 123 first updates locally stored status information of the node m 134. In addition, because the $(N+1)^{th}$ level controller A 123 already knows that the node m 134 is a boundary node according to the foregoing process, the $(N+1)^{th}$ level controller A 123 may send the first message to the $N^{th}$ level controller C 111, and the $N^{th}$ level controller C 111 may also update the locally stored status information of the node m 134 according to the first message.

Alternatively, if at an initial stage of network construction, the $(N+1)^{th}$ level controller A 123 receives a first message sent by the node m 134, the $(N+1)^{th}$ level controller A 123 first stores status information of the node m 134 according to the first message, then sends a fourth message to the node m 134, determines that the node m is a boundary node according to a first message returned by the node m 134 again, and then sends a first message to the $N^{th}$ level controller C 111 such that the $N^{th}$ level controller C 111 determines information about a connection between the $(N+1)^{th}$ level controllers A 123 and B 124 according to the first message, and stores status information of the node m.

According to the SDN system provided in this embodiment, each level of controller may obtain information about connections between controllers or nodes in a management domain of the controller, and update status information of a node in a network in real time according to the status information sent by the node such that each controller cannot obtain networking information, thereby improving security of the network.

In the foregoing network architecture, all levels of controllers may cooperatively complete networking data routing. Further, the $(N+1)^{th}$ level controller is further configured to send a fifth message to the $N^{th}$ level controller to which the $(N+1)^{th}$ level controller belongs if the received first message is a data transmission request message and includes an identifier of a node not belonging to the $(N+1)^{th}$ level controller, where the fifth message includes the identifier of the $(N+1)^{th}$ level controller, an identifier of a target node, and a first transmission path, and the first transmission path includes a source node and a first boundary node belonging to a same $(N+1)^{th}$ level controller. The $N^{th}$ level controller is further configured to receive the fifth message sent by the (N+1)$^{th}$ level controller belonging to the N$^{th}$ level controller, and send a message for acquiring a second transmission path to another (N+1)$^{th}$ level controller belonging to the N$^{th}$ level controller except the (N+1)$^{th}$ level controller, where the second transmission path includes the target node and a second boundary node belonging to a same (N+1)$^{th}$ level target controller. The N$^{th}$ level controller is further configured to determine a first backbone transmission path if the first boundary node and the second boundary node are connected, where the first backbone transmission path includes the source node, the first boundary node, the second boundary node, and the target node, the (N+1)$^{th}$ level controller is further configured to receive the first backbone transmission path sent by the N$^{th}$ level controller to which the (N+1)$^{th}$ level controller belongs, and the (N+1)$^{th}$ level controller is further configured to determine a sub-transmission path of the first backbone transmission path, and instruct each node in the first sub-transmission path to sequentially transmit the data from the source node to the target node.

In this embodiment, when determining a data transmission path, the N$^{th}$ level controller or the (N+1)$^{th}$ level controller needs to consider that a determined path meets one or a combination of the following conditions, such as being from a source node to a first boundary node, a path length being the shortest, a delay being the shortest, or a packet loss rate being the lowest.

Figure 4:
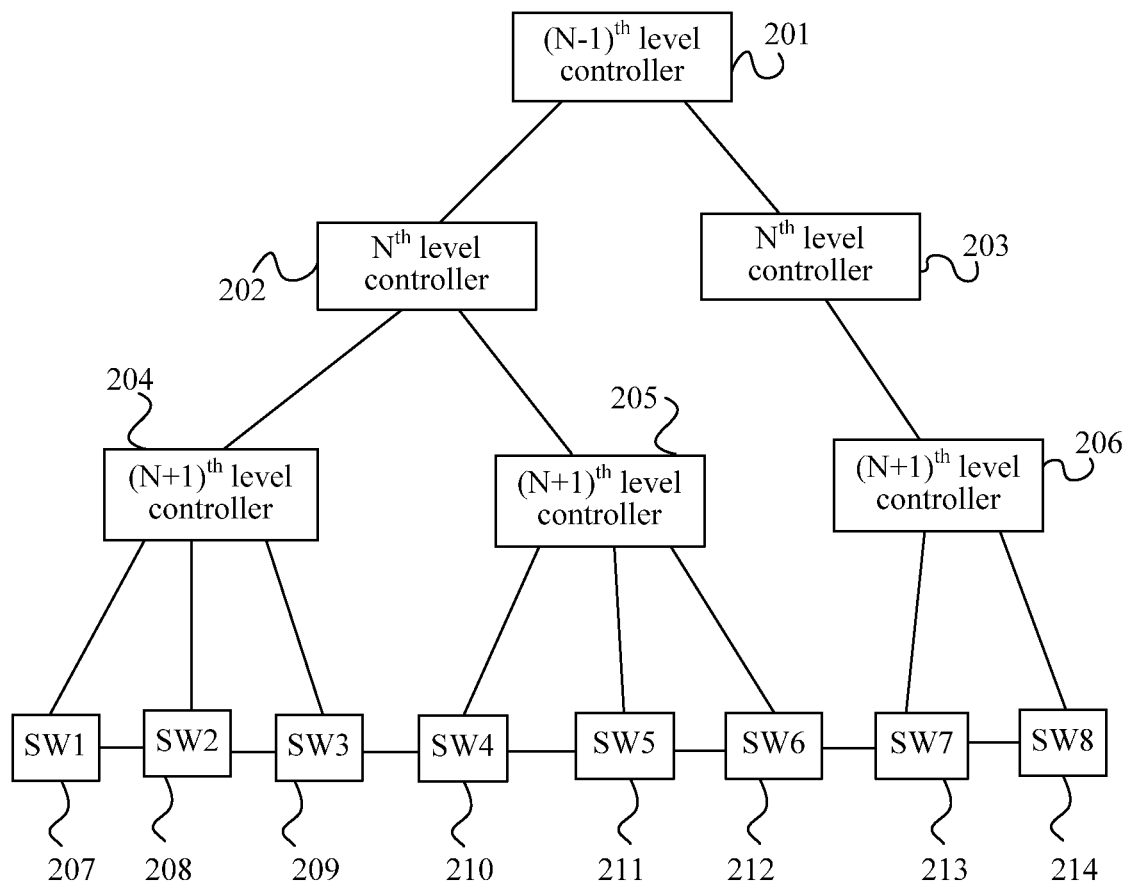
FIG. 4 is a schematic structural diagram of Embodiment 4 of an SDN system according to an embodiment of the present disclosure.

For example, FIG. 4 is a schematic structural diagram of Embodiment 4 of an SDN system according to an embodiment of the present disclosure. As shown in FIG. 4, the architecture is further an (N−1)$^{th}$ level controller 201, an N$^{th}$ level controller 202, and an N$^{th}$ level controller 203, an (N+1)$^{th}$ level controller 204, an (N+1)$^{th}$ level controller 205, an (N+1)$^{th}$ level controller 206, and the like, and a first switch (SW 1) 207, a second switch (SW 2) 208, a third switch (SW 3) 209, a fourth switch (SW 4) 210, a fifth switch (SW 5) 211, a sixth switch (SW 6) 212, a seventh switch (SW 7) 213, and an eighth switch (SW 8) 214. It should be noted that, the architecture may further include an (N+2)$^{th}$ level controller, an (N+3)$^{th}$ level controller, an (N+4)$^{th}$ level controller, an (N−2)$^{th}$ level controller, an (N−3)$^{th}$ level controller, and the like. The architecture may be further set according to an actual need, and quantities of levels of controllers in the figure are merely for description and setting of the quantities of the levels of controllers is not limited in this embodiment of the present disclosure.

In FIG. 4, the N$^{th}$ level controller 202 and the N$^{th}$ level controller 203 directly belong to the (N−1)$^{th}$ level controller 201, and the (N+1)$^{th}$ level controller 204 and the (N+1)$^{th}$ level controller 205 directly belong to the N$^{th}$ level controller 202 and indirectly belong to the (N−1)$^{th}$ level controller 201, and the (N+1)$^{th}$ level controller 206 directly belongs to the N$^{th}$ level controller 203 and indirectly belongs to the (N−1)$^{th}$ level controller 201. The SW 1 207, the SW 2 208, and the SW 3 209 directly belong to the (N+1)$^{th}$ level controller 204 and indirectly belong to the N$^{th}$ level controller 202 and the (N−1)$^{th}$ level controller 201. The SW 4 210, the SW 5 211, and the SW 6 212 directly belong to the (N+1)$^{th}$ level controller 205 and indirectly belong to the N$^{th}$ level controller 202 and the (N−1)$^{th}$ level controller 201, and the SW 7 213 and the SW 8 214 directly belong to the (N+1)$^{th}$ level controller 206 and indirectly belong to the N$^{th}$ level controller 203 and the (N−1)$^{th}$ level controller 201.

For the (N−1)$^{th}$ level controller 201, boundary nodes are the SW 1 207 and the SW 8 214. For the N$^{th}$ level controller 202, boundary nodes are the SW 1 207 and the SW 6 212. For the N$^{th}$ level controller 203, boundary nodes are the SW 7 213 and the SW 8 214. For the (N+1)$^{th}$ level controller 204, boundary nodes are the SW 1 207 and the SW 3 209. For the (N+1)$^{th}$ level controller 205, boundary nodes are the SW 4 210 and the SW 6 212. For the (N+1)$^{th}$ level controller 206, boundary nodes are the SW 7 213 and the SW 8 214.

Figure 5:
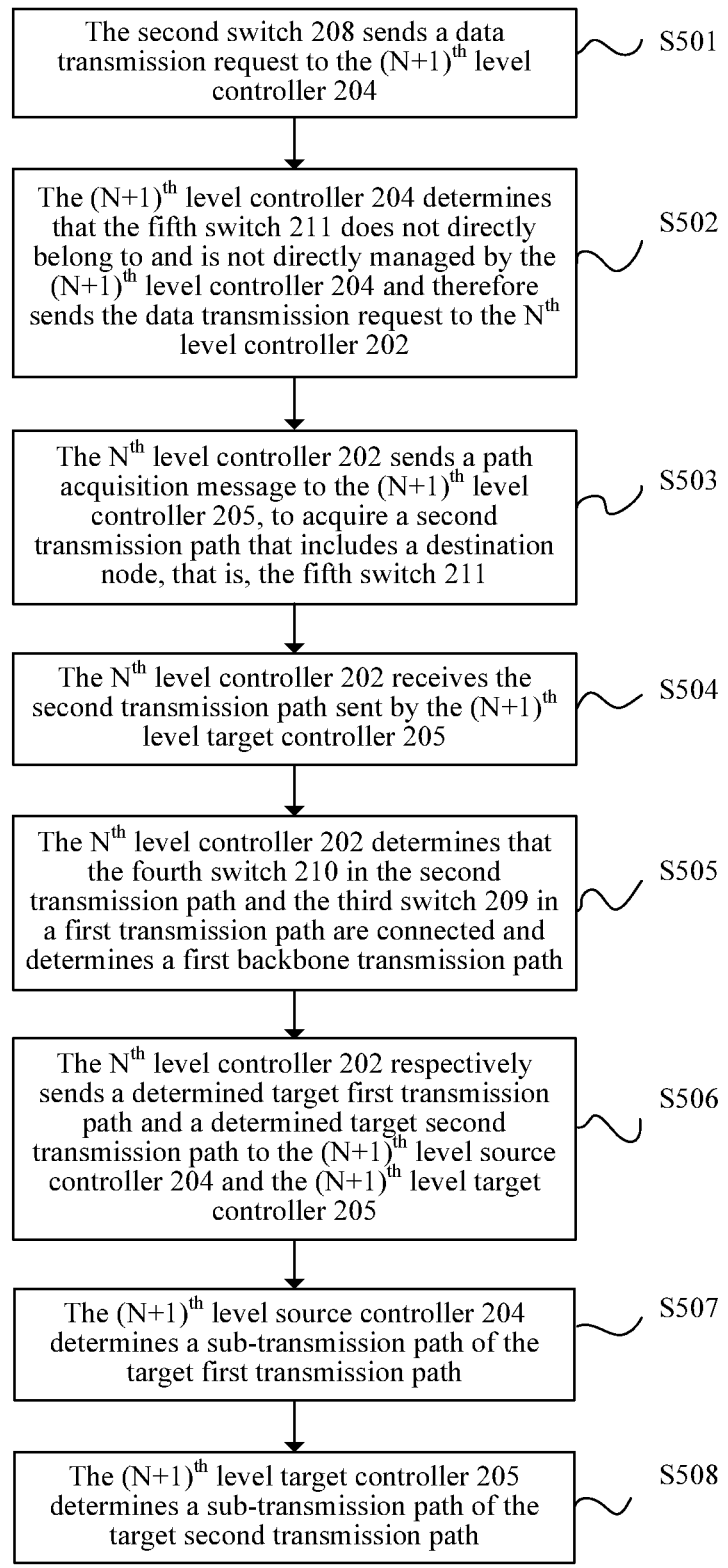
FIG. 5 is a schematic flowchart of a method for controlling a data route based on the SDN system shown in FIG. 4 according to an embodiment of the present disclosure.

FIG. 5 is a schematic flowchart of determining a data route by a controller based on the SDN system shown in FIG. 4. As shown in FIG. 5, assuming that in the SDN system, there is data needing to be transmitted from the second switch 208 to the fifth switch 211, a process in which controllers cooperatively determine a data route is as follows.

Step S501: The second switch 208 sends a data transmission request to the (N+1)$^{th}$ level controller 204.

A target node for data transmission is the fifth switch 211.

Step S502: The (N+1)$^{th}$ level controller 204 determines that the fifth switch 211 does not directly belong to and is not directly managed by the (N+1)$^{th}$ level controller 204 and therefore sends the data transmission request to the N$^{th}$ level controller 202.

When the (N+1)$^{th}$ level controller 204 sends the data transmission request, the foregoing data transmission request includes status information of the second switch 208, an identifier of the fifth switch 211, an identifier of the (N+1)$^{th}$ level controller 204, and a first transmission path composed of the second switch 208 and each boundary switch belonging to the (N+1)$^{th}$ level controller 204. Further, the first transmission path includes a path of the second switch 208→the third switch 209 and a path of the second switch 208→the first switch 207. It should be noted that, if in the SDN system shown in FIG. 4, there is further another switch between the second switch 208 and the third switch 209 or the first switch 207, a first transmission path of sending from the (N+1)$^{th}$ level controller 204 to the N$^{th}$ level controller 202 is still the foregoing path, and does not include information about any intermediate switch in order to ensure that the N$^{th}$ level controller 202 cannot obtain information about connections between nodes directly belonging to the (N+1)$^{th}$ level controller 204, that is, path information sent by each level of controller to a controller to which each level of controller directly belongs in the present disclosure merely indicates path costs.

It should be noted that, "→" in the embodiments of the present disclosure indicates that there is a connection relationship between nodes, but is not intended to limit a direction.

Step S503: The N$^{th}$ level controller 202 sends a path acquisition message to the (N+1)$^{th}$ level controller 205, to acquire a second transmission path that includes a destination node, that is, the fifth switch 211.

Step S504: The N$^{th}$ level controller 202 receives the second transmission path sent by the (N+1)$^{th}$ level target controller 205.

The second transmission path includes the fifth switch 211→the fourth switch 210 and the fifth switch 211→the sixth switch 212.

Same as the foregoing first transmission path, the second transmission path herein also indicates that the target node, that is, the fifth switch 211 and boundary nodes belonging to the (N+1)$^{th}$ level target controller 205 are reachable, but does not indicate that the fifth switch 211 and each boundary node belonging to the (N+1)$^{th}$ level target controller 205 are in a direct connection relationship.

Step S505: The N$^{th}$ level controller 202 determines that the fourth switch 210 in the second transmission path and the third switch 209 in a first transmission path are connected and determines a first backbone transmission path.

The first backbone transmission path is the second switch 208→the third switch 209→the fourth switch 210→the fifth switch 211.

It should be noted that, if in the SDN system in FIG. 4, for the first transmission path and the second transmission path, in addition to the fourth switch 210 and the third switch 209 for connection, there is further other nodes for connection of the first transmission path and the second transmission path, when determining the first backbone transmission path, the $N^{th}$ level controller 202 needs to compare path lengths, delays, or packet loss rates of all paths that are composed of the first transmission path and the second transmission paths and that enable that the source node and the destination node are reachable, and selects, from the paths, a first backbone transmission path that has a shortest path length, a shortest delay, or a lowest packet loss rate and that is composed of the first transmission path and the second transmission path.

In a possible implementation manner of this embodiment, the $N^{th}$ level controller is further configured to determine a third boundary node connected to the first boundary node and a fourth boundary node connected to the second boundary node if the second boundary node and the first boundary node are not connected, and the $N^{th}$ level controller is further configured to, if the third boundary node and the fourth boundary node belong to a same $(N+1)^{th}$ level controller, determine a second primary backbone transmission path, where the second primary backbone transmission path includes the source node, the first boundary node, the second boundary node, the target node, the third boundary node, and the fourth boundary node.

That is, if there is no node directly connecting the first transmission path and the second transmission path, the $N^{th}$ level controller needs to send a path acquisition message to another $(N+1)^{th}$ level controller belonging to the $N^{th}$ level controller to acquire a path connected to the first transmission path and the second transmission path until a reachable transmission path from the source node to the target node is finally acquired.

Step S506: The $N^{th}$ level controller 202 respectively sends a determined target first transmission path and a determined target second transmission path to the $(N+1)^{th}$ level source controller 204 and the $(N+1)^{th}$ level target controller 205.

Further, the $N^{th}$ level controller 202 sends the second switch 208→the third switch 209 to the $(N+1)^{th}$ level source controller 204 and sends the fourth switch 210→the fifth switch 211 to the $(N+1)^{th}$ level target controller 205.

Step S507: The $(N+1)^{th}$ level source controller 204 determines a sub-transmission path of the target first transmission path.

The sub-transmission path of the target first transmission path is the second switch 208→the third switch 209.

Step S508: The $(N+1)^{th}$ level target controller 205 determines a sub-transmission path of the target second transmission path.

The sub-transmission path of the target second transmission path is the fourth switch 210→the fifth switch 211.

Because based on the network in FIG. 4, the second switch 208 and the third switch 209 in the first transmission path and the fourth switch 210 and the fifth switch 211 in the second transmission path all are directly connected switches, both the first transmission path and the second transmission path may constitute a specific transmission path from a source node to a target node. If the second switch 208 and the third switch 209 are reachable by means of several other switches, and the fourth switch 210 and the fifth switch 211 are reachable by means of several other switches, the $(N+1)^{th}$ level source controller 204 needs to determine, according to information about connections between switches in a management domain of the $(N+1)^{th}$ level source controller 204 and according to a principle that a length of a path from the second switch 208 to the third switch 209 is the shortest, a delay from the second switch 208 to the third switch 209 is the shortest, or a packet loss rate from the second switch 208 to the third switch 209 is the lowest, which switches data needs to pass by when the data is transmitted from the second switch 208 to the third switch 209, and the $(N+1)^{th}$ level target controller 205 needs to determine, according to information about connections between switches in a management domain of the $(N+1)^{th}$ level target controller 205 and according to a principle that a length of a path from the fourth switch 210 to the fifth switch 211 is the shortest, a delay from the fourth switch 210 to the fifth switch 211 is the shortest, or a packet loss rate from the fourth switch 210 to the fifth switch 211 is the lowest, which switches data needs to pass by when the data is transmitted from the fourth switch 210 to the target switch 211.

Correspondingly, the data may be sequentially transmitted from the second switch 208 to the target node, that is, the fifth switch 211 according to the second switch 208→the third switch 209→the fourth switch 210→the fifth switch 211. Further, the foregoing transmission path further includes port information of each switch, for example, the second switch 208 (a right port)→the third switch 209 (a left port), and the third switch 209 (a right port)→the fourth switch 210 (a left port). The above descriptions of ports of each switch are merely exemplary and are not limited herein.

According to the data transmission controlling method provided in this embodiment, when a data transmission path is determined, a controller not directly managing nodes can only determine a backbone transmission path according to a transmission path acquired by each controller directly belonging to the controller not directly managing nodes. Each sub-transmission path included in the backbone transmission path is determined by a controller to which each node in the backbone transmission path directly belongs. The controllers cooperatively complete data transmission control, and none of the controllers can acquire networking information, and the controllers can only acquire information about boundary nodes in management domains of the controllers. Therefore, even if one or more controllers are maliciously attacked, networking information is not leaked, thereby improving security of the networking information.

In another possible implementation manner of the foregoing embodiment, the foregoing SDN system further includes at least two $(N+2)^{th}$ level controllers, where the two $(N+2)^{th}$ level controllers respectively directly belong to the $(N+1)^{th}$ level source controller and the $(N+1)^{th}$ level target controller. The $(N+1)^{th}$ level source controller and the $(N+1)^{th}$ level target controller are further configured to if it is determined that each node in a first primary backbone transmission path is an indirect belonging node, separately determine a secondary backbone transmission path of the target first transmission path and the target second transmission path in the first primary backbone transmission path according to a preset rule, and send the secondary backbone transmission path to each $(N+2)^{th}$ level controller to which each node in the secondary backbone transmission path directly belongs such that when determining that the each node in the secondary backbone transmission path is a direct belonging node according to the preset rule, each $(N+2)^{th}$ level controller separately determines a secondary-sub-transmission path of the secondary backbone transmission path and instructs each node in each secondary-sub-transmission path to sequentially transmit data from a source node to a target node.

Figure 6:
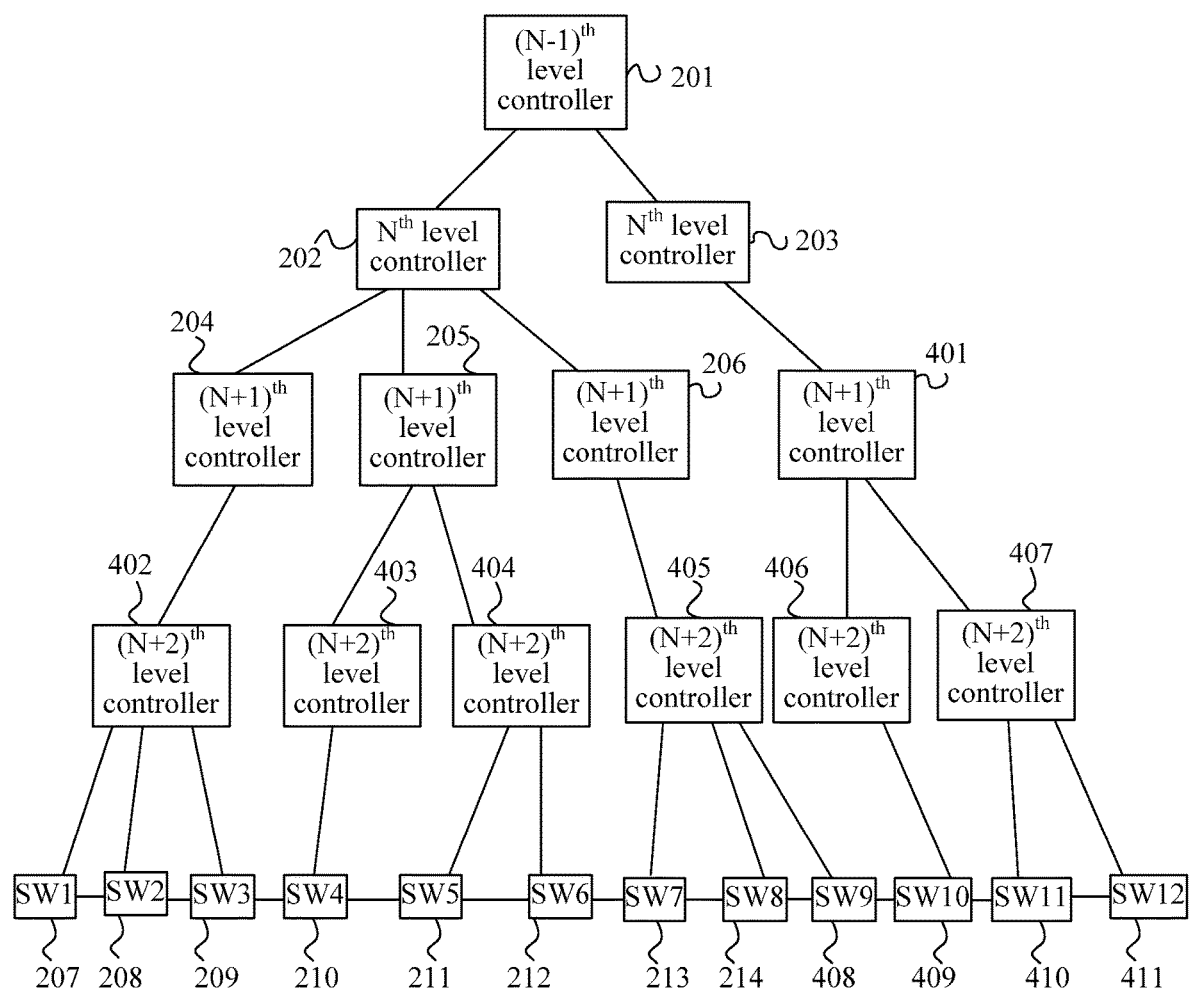
FIG. 6 is a schematic structural diagram of Embodiment 5 of an SDN system according to an embodiment of the present disclosure.

FIG. 6 is a schematic structural diagram of Embodiment 5 of an SDN system according to an embodiment of the present disclosure. As shown in FIG. 6, based on FIG. 4, the network further includes an $(N+1)^{th}$ level controller 401, an $(N+2)^{th}$ level controller 402, an $(N+2)^{th}$ level controller 403, an $(N+2)^{th}$ level controller 404, an $(N+2)^{th}$ level controller 405, an $(N+2)^{th}$ level controller 406, an $(N+2)^{th}$ level controller 407, a ninth switch (SW 9) 408, a tenth switch (SW 10) 409, an eleventh switch (SW 11) 410, and a twelfth switch (SW 12) 411. Further, the $(N+1)^{th}$ level controller 204, the $(N+1)^{th}$ level controller 205, and the $(N+1)^{th}$ level controller 206 directly belong to the $N^{th}$ level controller 202, the $(N+1)^{th}$ level controller 401 directly belongs to the $N^{th}$ level controller 203, the $(N+2)^{th}$ level controller 402 directly belongs to the $(N+1)^{th}$ level controller 204 and indirectly belongs to the $N^{th}$ level controller 202 and the $(N-1)^{th}$ level controller 201, the $(N+2)^{th}$ level controller 403 and the $(N+2)^{th}$ level controller 404 directly belong to the $(N+1)^{th}$ level controller 205 and indirectly belong to the $N^{th}$ level controller 202 and the $(N-1)^{th}$ level controller 201, the $(N+2)^{th}$ level controller 405 directly belongs to the $(N+1)^{th}$ level controller 206 and indirectly belongs to the $N^{th}$ level controller 202 and the $(N-1)^{th}$ level controller 201, the $(N+2)^{th}$ level controller 406 and the $(N+2)^{th}$ level controller 407 directly belong to the $(N+1)^{th}$ level controller 401 and indirectly belong to the $N^{th}$ level controller 203 and the $(N-1)^{th}$ level controller 201, the first switch 207 to the third switch 209 directly belong to the $(N+2)^{th}$ level controller 402 and indirectly belong to the $(N+1)^{th}$ level controller 204, the $N^{th}$ level controller 202, and the $(N-1)^{th}$ level controller 201, the fourth switch 210 directly belongs to the $(N+2)^{th}$ level controller 403 and indirectly belongs to the $(N+1)^{th}$ level controller 205, the $N^{th}$ level switch 202, and the $(N-1)^{th}$ level switch 201, the fifth switch 211 and the sixth switch 212 directly belong to the $(N+2)^{th}$ level controller 404 and indirectly belong to the $(N+1)^{th}$ level controller 205, the $N^{th}$ level controller 202, and the $(N-1)^{th}$ level controller 201, and the like.

Figure 7:
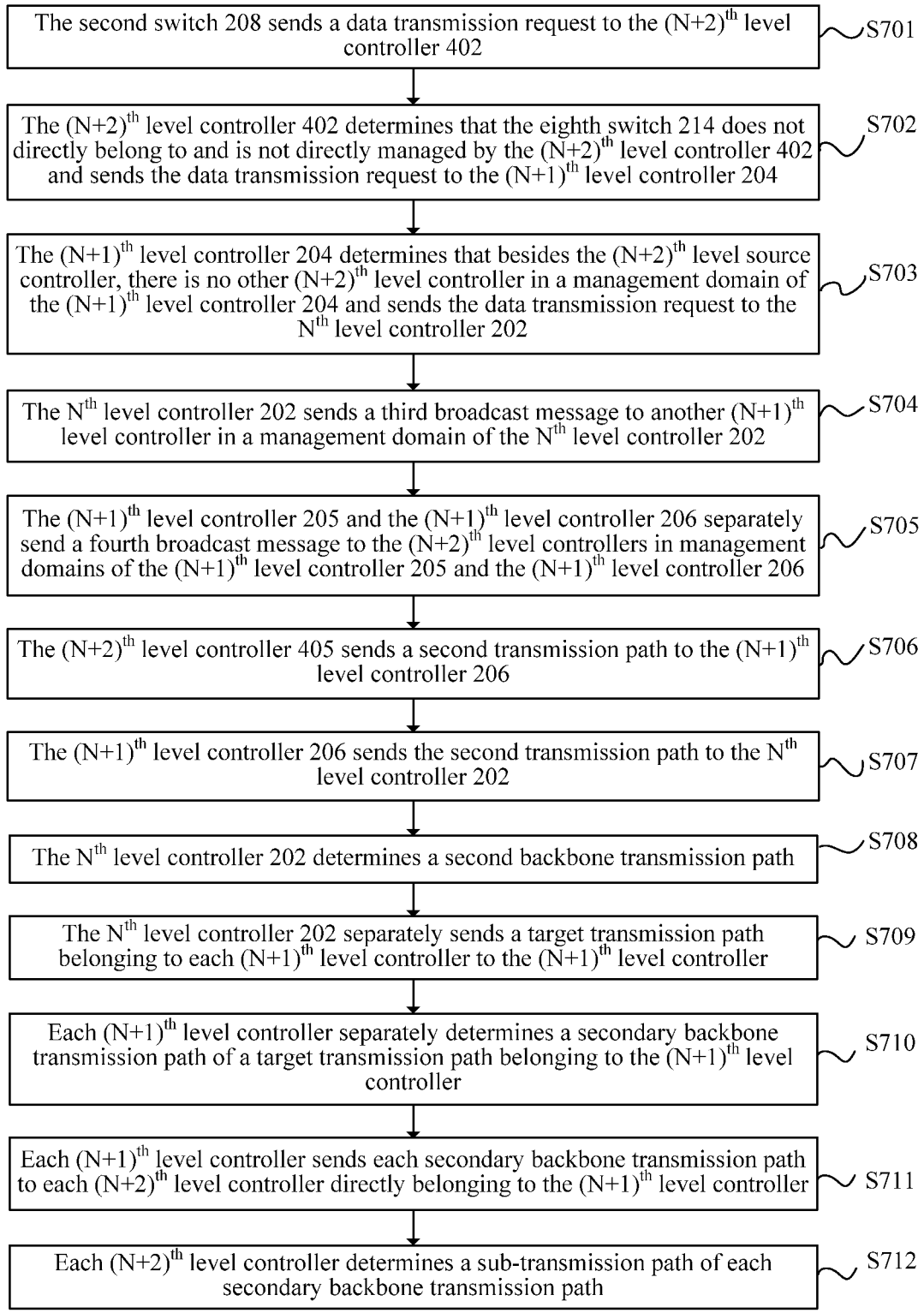
FIG. 7 is a schematic flowchart of a method for controlling a data route based on the SDN system shown in FIG. 6 according to an embodiment of the present disclosure.

FIG. 7 is a schematic flowchart of determining a data route by a controller based on the SDN system shown in FIG. 6. As shown in FIG. 7, assuming that there is data needing to be transmitted from the second switch 208 to the eighth switch 214, a process in which each controller in the network determines a data route is as follows.

Step S701: The second switch 208 sends a data transmission request to the $(N+2)^{th}$ level controller 402.

The data transmission request includes an identifier of a target node, that is, the eighth switch 214.

Step S702: The $(N+2)^{th}$ level controller 402 determines that the eighth switch 214 does not directly belong to and is not directly managed by the $(N+2)^{th}$ level controller 402 and sends the data transmission request to the $(N+1)^{th}$ level controller 204.

The data transmission request includes an identifier of the $(N+2)^{th}$ level controller 402, an identifier of the target node, that is, the eighth switch 214, and the first transmission path, that is, the second switch 208→the third switch 209, and the second switch 208→the first switch 207.

Step S703: The $(N+1)^{th}$ level controller 204 determines that besides the $(N+2)^{th}$ level source controller, there is no other $(N+2)^{th}$ level controller in a management domain of the $(N+1)^{th}$ level controller 204 and sends the data transmission request to the $N^{th}$ level controller 202.

The data transmission request includes an identifier of the $(N+2)^{th}$ level controller 402, the identifier of the target node, that is, the eighth switch 214, and the first transmission path, that is, the second switch 208→the third switch 209 and the second switch 208→the first switch 207.

If the $(N+1)^{th}$ level controller 204 determines that besides an $(N+2)^{th}$ level source controller, there is another $(N+2)^{th}$ level controller in a management domain of the $(N+1)^{th}$ level controller 204, the $(N+1)^{th}$ level controller 204 needs to send a path acquisition message to the other $(N+2)^{th}$ level controller in the management domain of the $(N+1)^{th}$ level controller 204. The path acquisition message is the same as the path acquisition message in FIG. 5 and is used to acquire a transmission path from a destination node to a boundary node that belongs to a same level of controller with the destination node. If the $(N+1)^{th}$ level controller 204 receives, within a preset time, a second transmission path that includes the destination node and that is sent by an $(N+2)^{th}$ level controller, each controller may determine a data route according to a process of the foregoing steps S503 to S508.

Further, all levels of controllers may acquire status information of controllers or nodes in management domains of the controllers in a broadcast form. For example, the $N^{th}$ level controller is further configured to send a first broadcast message to the $(N+1)^{th}$ level controllers belonging to the $N^{th}$ level controller, where the first broadcast message is used to acquire status information of the $(N+1)^{th}$ level controllers belonging to the $N^{th}$ level controller and status information of boundary nodes of the $(N+1)^{th}$ level controllers. The $(N+1)^{th}$ level controller is further configured to return, according to the first broadcast message, status information of the $(N+1)^{th}$ level controller to the $N^{th}$ level controller to which the $(N+1)^{th}$ level controller belongs, and the $(N+1)^{th}$ level controller is further configured to send the first broadcast message to the boundary nodes belonging to the $(N+1)^{th}$ level controller such that the boundary nodes return status information of the boundary nodes to the $(N+1)^{th}$ level controller, and send the received status information of the boundary nodes to the $N^{th}$ level controller.

The status information of each controller may include information about a backbone transmission path in a management domain of each controller, information about a path length between boundary nodes, bandwidth margins of the controllers, or loads of the controllers. The status information of the node may include a port status and a flow table status of the node.

Step S704: The $N^{th}$ level controller 202 sends a third broadcast message to another $(N+1)^{th}$ level controller in a management domain of the $N^{th}$ level controller 202.

The third broadcast message is similar to the foregoing first broadcast message and is used to acquire information about connections between the target node and boundary nodes belonging to a same $(N+1)^{th}$ level controller as the target node.

Step S705: The $(N+1)^{th}$ level controller 205 and the $(N+1)^{th}$ level controller 206 separately send a fourth broadcast message to the $(N+2)^{th}$ level controllers in management domains of the $(N+1)^{th}$ level controller 205 and the $(N+1)^{th}$ level controller 206.

The fourth broadcast message is similar to the foregoing third broadcast message and the foregoing first broadcast message, and is used to acquire information about connections between the target node and boundary nodes belonging to a same $(N+2)^{th}$ level controller as the target node.

Step S706: The $(N+2)^{th}$ level controller 405 sends a second transmission path to the $(N+1)^{th}$ level controller 206.

Further, after receiving the fourth broadcast message, the $(N+2)^{th}$ level controller 405 may know through search that the target node, that is, the eighth switch 214 is a node directly belonging to the $(N+2)^{th}$ level controller 405, and information about connections between the eighth switch 214 and boundary nodes in a management domain of the $(N+2)^{th}$ level controller 405 is the eighth switch 214→the ninth switch 408 and the eighth switch 214→the seventh switch 213. Therefore, a determined second transmission path is sent to the $(N+1)^{th}$ level controller 206. It should be noted that, in FIG. 6, whether there is further another switch from the eighth switch 214 to the ninth switch 408 or the seventh switch 213 does not affect sending of the second transmission path by the $(N+2)^{th}$ level controller 405 to the $(N+1)^{th}$ level controller 206, that is, the second transmission path merely indicates that the eighth switch 214 to the ninth switch 408 or the seventh switch 213 is reachable in terms of path, and does not indicate a connection relationship.

Step S707: The $(N+1)^{th}$ level controller 206 sends the second transmission path to the $N^{th}$ level controller 202.

According to the SDN system provided in this embodiment of the present disclosure, the foregoing $N^{th}$ level controller is further configured to determine, according to status information of a boundary node of the $(N+1)^{th}$ level controller that is managed by and that directly belongs to the $N^{th}$ level controller, each third boundary node connected to each first boundary node and each fourth boundary node connected to each second boundary node when no second boundary node in each second transmission path is connected to the first boundary node in each first transmission path, and determine a second primary backbone transmission path, where the second primary backbone transmission path includes the source node, the first boundary node, the second boundary node, the target node, and the third boundary node and the fourth boundary node that meet a preset condition if the third boundary node and the fourth boundary node belong to a same $(N+1)^{th}$ level controller.

Step S708: The $N^{th}$ level controller 202 determines a second backbone transmission path.

Further, after the $N^{th}$ level controller 202 receives the second transmission path, it may be known according to information about connections between the $(N+1)^{th}$ level controllers managed by the $N^{th}$ level controller 202 that boundary nodes in the first transmission path and the second transmission path are not connected, the third switch 209 in the first transmission path is connected to the fourth switch 210, the seventh switch 213 and the sixth switch 212 are connected, and both the fourth switch 210 and the sixth switch 212 belong to the $(N+1)^{th}$ level controller 205, and therefore, it is determined that a second backbone transmission path is the second switch 208→the third switch 209→the fourth switch 210→the sixth switch 212→the seventh switch 213→the eighth switch 214.

Step S709: The $N^{th}$ level controller 202 separately sends a target transmission path belonging to each $(N+1)^{th}$ level controller to the $(N+1)^{th}$ level controller.

Further, the $N^{th}$ level controller 202 sends information about the second switch 208→the third switch 209 to the $(N+1)^{th}$ level controller 204, sends information about the fourth switch 210→the sixth switch 212 to the $(N+1)^{th}$ level controller 205, and sends information about the seventh switch 213→the eighth switch 214 to the $(N+1)^{th}$ level controller 206.

After each $(N+1)^{th}$ level controller receives path information, because each node is not a node directly belonging to the controller, the $(N+1)^{th}$ level source controller and the $(N+1)^{th}$ level target controller are further configured to determine, separately according a preset rule, secondary backbone transmission paths of a target first transmission path and a target second transmission path in the first primary backbone transmission path if each node in the first primary backbone transmission path is an indirect belonging node, and send the secondary backbone transmission paths to each $(N+2)^{th}$ level controller to which each node in the secondary backbone transmission paths directly belongs such that when determining that each node in the secondary backbone transmission path is a direct belonging node according to the preset rule, each $(N+2)^{th}$ level controller separately determines each secondary sub-transmission path of the secondary backbone transmission paths, and instruct each node in each secondary sub-transmission path to sequentially transmit the data from the source node to the target node.

Step S710: Each $(N+1)^{th}$ level controller separately determines a secondary backbone transmission path of a target transmission path belonging to the $(N+1)^{th}$ level controller.

The $(N+1)^{th}$ level controller 204 determines, according to information about connections between $(N+2)^{th}$ level controllers managed by the $(N+1)^{th}$ level controller 204, that a secondary backbone transmission path, which is in a management domain of the $(N+1)^{th}$ level controller 204, of the second switch 208→the third switch 209 is the second switch 208→the third switch 209. Similarly, the $(N+1)^{th}$ level controller 205 determines that a secondary backbone transmission path, in a management domain of the $(N+1)^{th}$ level controller 205, of the fourth switch 210→the sixth switch 212 is the fourth switch 210→the fifth switch 211→the sixth switch 212.

Step S711: Each $(N+1)^{th}$ level controller sends each secondary backbone transmission path to each $(N+2)^{th}$ level controller directly belonging to the $(N+1)^{th}$ level controller.

The $(N+1)^{th}$ level controller 204 sends the second switch 208→the third switch 209 to the $(N+2)^{th}$ level controller 402, and the $(N+1)^{th}$ level controller 205 sends the fourth switch 210 to the $(N+2)^{th}$ level controller 403 and the fifth switch 211→the sixth switch 212 to the $(N+2)^{th}$ level controller 402.

Step S712: Each $(N+2)^{th}$ level controller determines a sub-transmission path of each secondary backbone transmission path.

The $(N+2)^{th}$ level controller 402 determines that a sub-transmission path of the second switch 208→the third switch 209 is the second switch 208→the third switch 209, and controls each switch to send data from the source node, that is, the second switch 208 to the target node, that is, the eighth switch 214.

According to the method of data routing provided in this embodiment, when a data transmission path is determined, a controller not directly managing a node can acquire a backbone transmission path between nodes belonging to a domain of the controller, where a secondary backbone transmission path included in the backbone transmission path and each sub-transmission paths included in each secondary backbone transmission path are separately sequentially obtained by different levels of controllers according to information about nodes in management domains of the controllers. The controllers cooperatively complete data transmission control, and none of the controllers can acquire networking information, and the controllers can only acquire information about boundary nodes in management domains of the controllers. Therefore, even if one or more controllers are maliciously attacked, networking information is not leaked, thereby improving security of the networking information.

Figure 8:
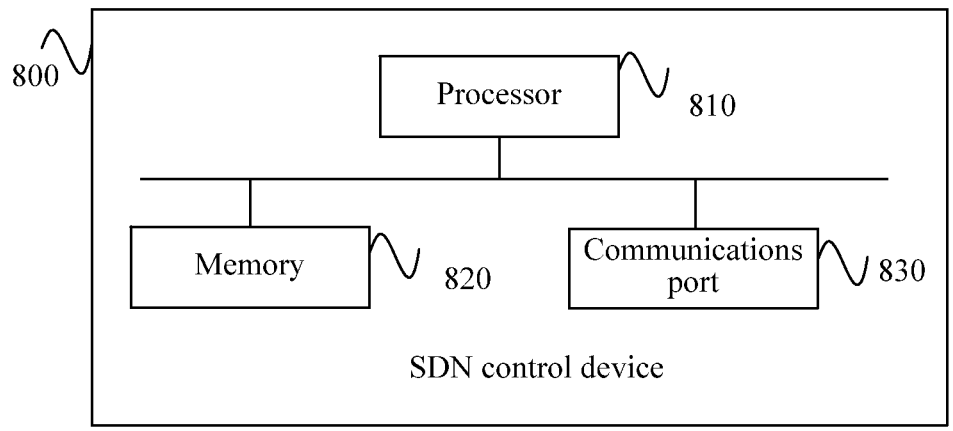
FIG. 8 is a schematic structural diagram of an embodiment of an SDN control device according to an embodiment of the present disclosure.

FIG. 8 is a schematic structural diagram of an embodiment of an SDN control device according to an embodiment of the present disclosure. As shown in FIG. 8, the SDN control device 800 includes a processor 810, a memory 820, and at least one communications port 830. The communications port 830 is configured to communicate with an external device. The memory 820 is used to store a computer program instruction. The processor 810 is coupled with the memory and is configured to invoke the computer program instruction stored in the memory 820 to perform a function of an $N^{th}$ level controller, an $(N+1)^{th}$ level controller, an $(N-1)^{th}$ level controller, or an $(N+2)^{th}$ level controller in the SDN system.

A function of the processor 810 of the SDN system control device provided in this embodiment may be set according to a level on which the controller is in the SDN system. All controllers constituting the SDN system may acquire information about nodes in management domains of the controllers, and cooperatively complete data transmission control of the SDN system according to managed information. For the function of the processor 810 in the SDN system control device, reference may be made to specific descriptions of the foregoing embodiments, and details are not described herein again.

According to the SDN system control device provided in this embodiment, different SDN system control devices separately manage information about different controllers or nodes according to positions of the SDN system control devices in an SDN system, and none of the SDN system control devices can obtain networking information. Therefore, even if one or more controllers are attacked, networking information is not leaked, thereby improving security of the networking information.

Figure 9:
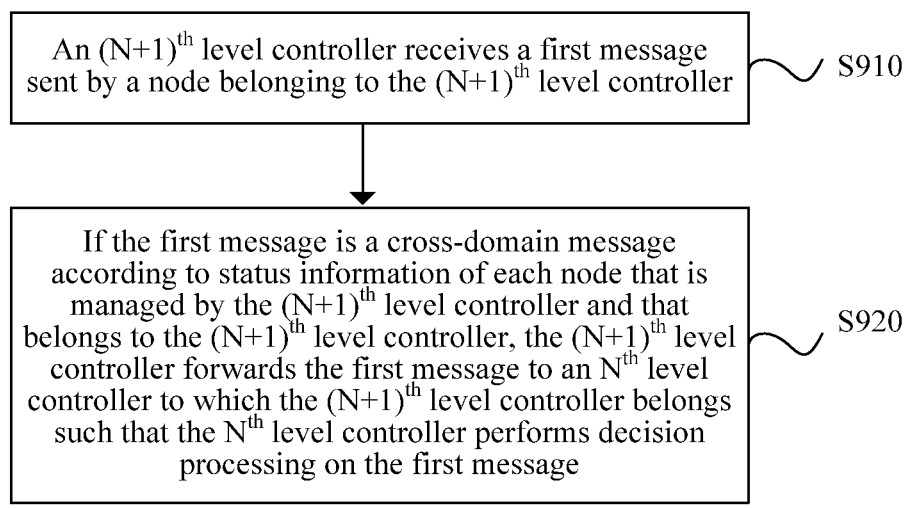
FIG. 9 is a schematic flowchart of Embodiment 1 of an SDN controlling method according to an embodiment of the present disclosure.

FIG. 9 is a schematic flowchart of Embodiment 1 of an SDN controlling method according to an embodiment of the present disclosure. As shown in FIG. 9, the SDN controlling method includes the following steps.

Step S910: An $(N+1)^{th}$ level controller receives a first message sent by a node belonging to the $(N+1)^{th}$ level controller.

Step S920: If the first message is a cross-domain message according to status information of each node that is managed by the $(N+1)^{th}$ level controller and that belongs to the $(N+1)^{th}$ level controller, the $(N+1)^{th}$ level controller forwards the first message to an $N^{th}$ level controller to which the $(N+1)^{th}$ level controller belongs such that the $N^{th}$ level controller performs decision processing on the first message.

The first message includes an identifier of the node sending the first message, and the cross-domain message includes an identifier of a node belonging to another $(N+1)^{th}$ level controller.

In one possible implementation manner of this embodiment, the forwarding the first message to an $N^{th}$ level controller to which the $(N+1)^{th}$ level controller belongs includes if it is determined that the received first message includes an identifier of another $(N+1)^{th}$ level controller, adding, by the $(N+1)^{th}$ level controller, an identifier of the $(N+1)^{th}$ level controller to the first message, to obtain a second message, and sending, by the $(N+1)^{th}$ level controller, the second message to the $N^{th}$ level controller to which the $(N+1)^{th}$ level controller belongs such that the $N^{th}$ level controller determines a backbone topology of the SDN system according to the second message.

In another possible implementation manner of this embodiment, the method further includes if it is determined that the received first message is a data transmission request message and includes an identifier of a node not belonging to the $(N+1)^{th}$ level controller, sending, by the $(N+1)^{th}$ level controller, a fifth message to the $N^{th}$ level controller to which the $(N+1)^{th}$ level controller belongs, where the fifth message includes the identifier of the $(N+1)^{th}$ level controller, an identifier of a target node, and a first transmission path, and the first transmission path includes a source node and a first boundary node belonging to the same $(N+1)^{th}$ level controller, receiving, by the $(N+1)^{th}$ level controller, a first backbone transmission path sent by the $N^{th}$ level controller to which the $(N+1)^{th}$ level controller belongs, and determining, by the $(N+1)^{th}$ level controller, a sub-transmission path of the first backbone transmission path, and instructing each node in the first sub-transmission path to sequentially transmit the data from the source node to the target node.

Alternatively, the SDN controlling method provided in the foregoing embodiment further includes further receiving, by the $(N+1)^{th}$ level controller, a first broadcast message sent by the $N^{th}$ level controller to which the $(N+1)^{th}$ level controller belongs, returning, by the $(N+1)^{th}$ level controller according to the first broadcast message, status information of the $(N+1)^{th}$ level controller to the $N^{th}$ level controller to which the $(N+1)^{th}$ level controller belongs, and sending, by the $(N+1)^{th}$ level controller, the first broadcast message to boundary nodes belonging to the $(N+1)^{th}$ level controller such that the boundary nodes return status information of the boundary nodes to the $(N+1)^{th}$ level controller, and send the received status information of the boundary nodes to the $N^{th}$ level controller.

According to the SDN controlling method provided in this embodiment, for detailed explanations and descriptions of processing procedures of an $(N+1)^{th}$ level controller, reference may be made to explanations and descriptions of the foregoing embodiments and related embodiments of the SDN system in the present disclosure, and details are not described herein again.

According to the SDN controlling method provided in this embodiment of the present disclosure, an $(N+1)^{th}$ level controller manages status information of only each node belonging to the $(N+1)^{th}$ level controller, and completes, by cooperating with an $N^{th}$ level controller and according to the status information of each node managed by the $(N+1)^{th}$ level controller, network control such as data routing and topology discovery of a network such that when any controller is attacked, networking information cannot be leaked, thereby improving security of network information.

Figure 10:
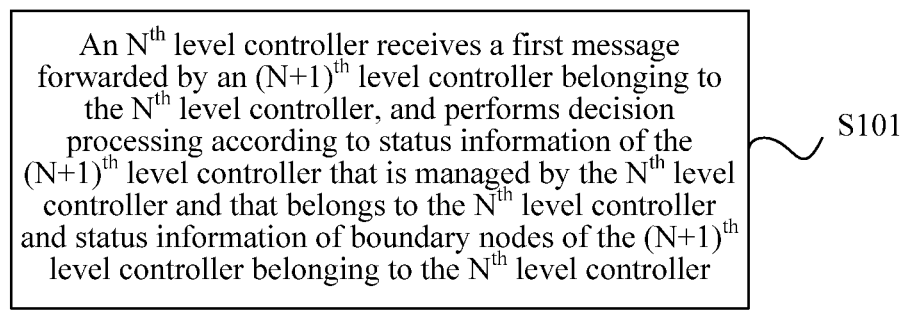
FIG. 10 is a schematic flowchart of Embodiment 2 of an SDN controlling method according to an embodiment of the present disclosure.

FIG. 10 is a schematic flowchart of Embodiment 2 of an SDN controlling method according to an embodiment of the present disclosure. As shown in FIG. 10, the SDN controlling method includes the following step.

Step S101: An $N^{th}$ level controller receives a first message forwarded by an $(N+1)^{th}$ level controller belonging to the $N^{th}$ level controller, and performs decision processing according to status information of the $(N+1)^{th}$ level controller that is managed by the $N^{th}$ level controller and that belongs to the $N^{th}$ level controller and status information of boundary nodes of the $(N+1)^{th}$ level controller belonging to the $N^{th}$ level controller.

Boundary nodes of each $(N+1)^{th}$ level controller include a node, which is connected to a node belonging to another $(N+1)^{th}$ level controller, of all nodes belonging to the $(N+1)^{th}$ level controller.

The performing decision processing includes determining a backbone topology of the SDN system, determining a backbone transmission path of data transmission, or updating the status information of the $(N+1)^{th}$ level controller that is managed by the $N^{th}$ level controller and that belongs to the $N^{th}$ level controller and the status information of the boundary nodes of the $(N+1)^{th}$ level controller belonging to the $N^{th}$ level controller.

According to the SDN controlling method provided in this embodiment, for detailed explanations and descriptions of processing procedures of an $N^{th}$ level controller, reference may be made to explanations and descriptions of the foregoing embodiments and related embodiments of the SDN system in the present disclosure, and details are not described herein again.

According to the SDN controlling method provided in the embodiments of the present disclosure, an $N^{th}$ level controller manages only each $(N+1)^{th}$ level controller belonging to the $N^{th}$ level controller and status information of each boundary node of the $(N+1)^{th}$ level controller belonging to the $N^{th}$ level controller, and completes, by cooperating with the $(N+1)^{th}$ level controller and according to the status information managed by the $N^{th}$ level controller, network control such as data routing and topology discovery of a network such that when any controller is attacked, networking information cannot be leaked, thereby improving security of network information.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A software defined network (SDN) system, comprising:
   a first Nth level controller; and
   a first (N+1)th level controller configured to:
      receive a first message from a first node belonging to the first (N+1)th level controller, wherein the first message comprises an identifier of the first node; and
      send a second message to the first Nth level controller to which the first (N+1)th level controller belongs in response to determining that the first message is a cross-domain message comprising an identifier of a second node belonging to a second (N+1)th level controller, wherein N is a positive integer greater than or equal to 1,
   wherein the first Nth level controller is configured to:
      receive the second message from the first (N+1)th level controller; and
      perform decision processing according to first status information of the first (N+1)th level controller and second status information of a boundary node of the first (N+1)th level controller, and
      wherein the boundary node of the first (N+1)th level controller connects to a node that belongs to a different (N+1)th level controller.

2. The SDN system of claim 1, wherein the first (N+1)th level controller is further configured to add an identifier of the first (N+1)th level controller to the first message to obtain the second message in response to receiving the first message, wherein the second message comprises an identifier of the second (N+1)th level controller, and wherein the first Nth level controller is further configured to:
   receive a plurality of second messages from each of the (N+1)th level controllers that belongs to the first Nth level controller;
   determine a backbone topology of the SDN system based on the second messages; and
   determine a backbone transmission path of data in the SDN system based on the backbone topology.

3. The SDN system of claim 2, further comprising an (N−1)th level controller, wherein the first Nth level controller belongs to the (N−1)th level controller, wherein N is an integer greater than 1, and wherein the first Nth level controller is further configured to:
   replace the identifier of the second (N+1)th level controller in the second message with an identifier of the first Nth level controller to obtain a third message based on the second message not belonging to the first Nth level controller; and
   send the third message to the (N−1)th level controller to which the first Nth level controller belongs,
   wherein the (N−1)th level controller is configured to:
      receive the third message from the first Nth level controller;
      determine the backbone topology of the SDN system according to the third message; and
      determine the backbone transmission path of the data in the SDN system according to the backbone topology of the SDN system.

4. The SDN system of claim 2, wherein the first (N+1)th level controller is further configured to separately send a fourth message to the first Nth level controller and a node that belongs to the first (N+1)th level controller, wherein the fourth message comprises an identifier of the node to which the fourth message is sent and the identifier of the first (N+1)th level controller, and
   wherein the first Nth level controller is further configured to:
      receive the fourth message from the first (N+1)th level controller;
      determine the backbone topology of the SDN system based on the second message and the fourth message that comprise an identifier of a same node; and
      determine the backbone transmission path of the data in the SDN system based on the backbone topology of the SDN system.

5. The SDN system of claim 1, wherein the first message comprises the first status information, and wherein the first (N+1)th level controller is further configured to:
   update the first status information, which is comprised in the second message, of the first node based on the first message; and
   send the second message to the first Nth level controller based on the first message comprising the first status information of the first node, wherein the first node is a boundary node of the first (N+1)th level controller, and wherein the first Nth level controller is further configured to update the first status information of the boundary node of the first (N+1)th level controller based on the second message.

6. The SDN system of claim 1, wherein the first (N+1)th level controller is further configured to send a fifth message to the first Nth level controller in response to the first message being a data transmission request message and comprising an identifier of a node that does not belong to the first (N+1)th level controller, wherein the fifth message comprises an identifier of the first (N+1)th level controller, an identifier of a target node, and a first transmission path, wherein the first transmission path comprises a source node and a first boundary node that belongs to the first (N+1)th level controller, and wherein the first Nth level controller is further configured to:
 receive the fifth message from the first (N+1)th level controller;
 send a message for acquiring a second transmission path to a third (N+1)th level controller that belongs to the first Nth level controller, wherein the second transmission path comprises the target node and a second boundary node that belongs to the third (N+1)th level target controller; and
 determine a first backbone transmission path in response to the first boundary node and the second boundary node being connected, wherein the first backbone transmission path comprises the source node, the first boundary node, the second boundary node, and the target node, and wherein the first (N+1)th level controller is further configured to:
 receive the first backbone transmission path from the first Nth level controller;
 determine a sub-transmission path of the first backbone transmission path; and
 instruct each node in the sub-transmission path to sequentially transmit data from the source node to the target node.

7. A software defined network (SDN) controller comprising:
 a receiver configured to receive a first message from a first node that belongs to the SDN controller, wherein the first message comprises an identifier of the first node;
 a processor coupled to the receiver and configured to determine whether the first message is a cross-domain message comprising an identifier of a second node belonging to another SDN controller; and
 a transmitter coupled to the processor and configured to send a second message to an upper level controller to which the SDN controller belongs in response to determining that the first message is the cross-domain message comprising the identifier of the second node belonging to the other SDN controller,
 wherein the SDN controller and the other SDN controller belong to a same level in an SDN system.

8. A software defined network (SDN) controlling method implemented by an SDN controller and comprising:
 receiving a first message from a first node that belongs to the SDN controller, wherein the first message comprises an identifier of the first node;
 determining whether the first message is a cross-domain message comprising an identifier of a second node belonging to another SDN controller; and
 sending a second message to an upper level controller to which the SDN controller belongs in response to determining that the first message is the cross-domain message comprising the identifier of the second node belonging to the other SDN controller,
 wherein the SDN controller and the other SDN controller belong to a same level in an SDN system.

9. The SDN controlling method of claim 8, wherein sending the second message to the upper level controller comprises:
 adding an identifier of the SDN controller to the first message to obtain the second message in response to the first message comprising an identifier of the other SDN controller; and
 sending the second message to the upper level controller.

10. The SDN controlling method of claim 8, further comprising:
 sending a third message to the upper level controller in response to the first message being a data transmission request message and comprising an identifier of a node that does not belong to the SDN controller, wherein the third message comprises an identifier of the SDN controller, an identifier of a target node, and a first transmission path, and wherein the first transmission path comprises a source node and a first boundary node that belong to the SDN controller;
 receiving a first backbone transmission path from the upper level controller to which the SDN controller belongs;
 determining a sub-transmission path of the first backbone transmission path; and
 instructing each node in the sub-transmission path to sequentially transmit data from the source node to the target node.

11. The SDN controlling method of claim 8, further comprising:
 receiving a first broadcast message from the upper level controller;
 returning, based on the first broadcast message, status information of the SDN controller to the upper level controller;
 sending the first broadcast message to boundary nodes that belong to the SDN controller to prompt the boundary nodes to return their status information to the SDN controller; and
 sending the status information to the upper level controller.

12. A software defined network (SDN) controlling method implemented by an SDN controller and comprising:
 receiving a first message from a first lower level controller that belongs to the SDN controller;
 receiving a second message from the first lower level controller in response to determining that the first message comprises an identifier of a node that belongs to a second lower level controller; and
 performing decision processing based on status information of the first lower level controller and status information of boundary nodes of the first lower level controller,
 wherein a boundary node of the first lower level controller belongs to the first lower level controller and connects to the node that belongs to the second lower level controller, and
 wherein the first lower level controller and the second lower level controller belong to a same level an SDN system.

13. The SDN controlling method of claim 12, wherein performing the decision processing comprises one of:
 determining a backbone topology of the SDN system,
 determining a backbone transmission path of data transmission, or
 updating the status information of the first lower level controller that is managed by the SDN controller and that belongs to the SDN controller and the status information of the boundary nodes of the first lower level controller that belong to the SDN controller.

14. A software defined network (SDN) controller comprising:
- a receiver configured to:
  - receive a first message from a first lower level controller that belongs to the SDN controller; and
  - receive a second message from the first lower level controller in response to determining that the first message comprises an identifier of a node that belongs to a second lower level controller; and
- a processor configured to perform decision processing based on status information of the first lower level controller and status information of boundary nodes of the first lower level controller,
- wherein a boundary node of the first lower level controller belongs to the first lower level controller and connects to the node that belongs to the second lower level controller, and
- wherein the first lower level controller and the second lower level controller belong to a same level in an SDN system.

15. A computer program product comprising instructions that are stored on a non-transitory computer readable medium and that, when executed by a processor, cause a software defined network (SDN) controller to:
- receive a first message from a first node that belongs to the SDN controller, wherein the first message comprises an identifier of the first node;
- determine whether the first message is a cross-domain message comprising an identifier of a second node belonging to another SDN controller; and
- send a second message to an upper level controller that belongs to the SDN controller in response to determining that the first message is the cross-domain message comprising the identifier of the second node belonging to the other SDN controller,
- wherein the SDN controller and the other SDN controller belong to a same level in an SDN system.

16. A computer program product comprising instructions that are stored on a non-transitory computer readable medium and that, when executed by a processor, cause a software defined network (SDN) controller to:
- receive a first message from a first lower level controller that belongs to the SDN controller;
- receive a second message from the first lower level controller in response to determining that the first message comprises an identifier of a node that belongs to a second lower level controller; and
- perform decision processing based on status information of the first lower level controller and status information of boundary nodes of the first lower level controller,
- wherein a boundary node of the first lower level controller belongs to the first lower level controller and connects to the node that belongs to the second lower level controller, and
- wherein the first lower level controller and the second lower level controller belong to a same level in an SDN system.

17. The SDN system of claim 1, wherein the second status information comprises one or more of port status information, flow table status information, connection status information, or capability information.

18. The SDN controller of claim 7, wherein the processor is further configured to update, based on the first message, status information in the first message and of the first node, wherein the status information comprises one or more of port status information, flow table status information, connection status information, or capability information.

19. The SDN controlling method of claim 11, wherein the status information comprises one or more of port status information, flow table status information, connection status information, or capability information.

20. The SDN controlling method of claim 12, wherein the status information comprises one or more of port status information, flow table status information, connection status information, or capability information.

* * * * *

UNITED STATES PATENT AND TRADEMARK OFFICE
CERTIFICATE OF CORRECTION

| | |
|---|---|
| PATENT NO. | : 11,637,755 B2 |
| APPLICATION NO. | : 17/205357 |
| DATED | : April 25, 2023 |
| INVENTOR(S) | : Donghui Wang and Jinming Li |

It is certified that error appears in the above-identified patent and that said Letters Patent is hereby corrected as shown below:

In the Claims

Claim 12, Column 26, Line 56: "level an SDN" should read "level in an SDN"

Signed and Sealed this
Thirtieth Day of May, 2023

Katherine Kelly Vidal
*Director of the United States Patent and Trademark Office*